(12) United States Patent
Okuyama et al.

(10) Patent No.: US 8,980,409 B2
(45) Date of Patent: Mar. 17, 2015

(54) LAMINATE, METHOD FOR PRODUCING SAME, AND METHOD FOR PRODUCING DEVICE STRUCTURE USING SAME

(75) Inventors: Tetsuo Okuyama, Otsu (JP); Kazuyuki Ouya, Otsu (JP); Toshiyuki Tsuchiya, Otsu (JP); Naoki Watanabe, Otsu (JP); Satoshi Maeda, Otsu (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 14/111,330

(22) PCT Filed: Apr. 12, 2012

(86) PCT No.: PCT/JP2012/060020
§ 371 (c)(1),
(2), (4) Date: Oct. 11, 2013

(87) PCT Pub. No.: WO2012/141248
PCT Pub. Date: Oct. 18, 2012

(65) Prior Publication Data
US 2014/0041800 A1    Feb. 13, 2014

(30) Foreign Application Priority Data

Apr. 15, 2011 (JP) ................................. 2011-091040
Oct. 31, 2011 (JP) ................................. 2011-239766

(51) Int. Cl.
```
B32B 3/00      (2006.01)
B32B 38/10     (2006.01)
B29C 65/14     (2006.01)
B29C 65/76     (2006.01)
B29C 65/00     (2006.01)
B29C 65/02     (2006.01)
C08G 73/10     (2006.01)
C08G 73/22     (2006.01)
C08L 79/08     (2006.01)
B32B 7/06      (2006.01)
B32B 38/00     (2006.01)
B29C 59/14     (2006.01)
B29C 35/08     (2006.01)
```

(52) U.S. Cl.
CPC ............ *B32B 38/10* (2013.01); *B29C 65/1432* (2013.01); *B29C 65/1496* (2013.01); *B29C 65/76* (2013.01); *B29C 66/028* (2013.01); *B29C 66/1122* (2013.01); *B29C 66/43* (2013.01); *B29C 66/71* (2013.01); *B29C 66/7465* (2013.01); *B29C 66/919* (2013.01); *B29C 65/02* (2013.01); *C08G 73/1085* (2013.01); *C08G 73/22* (2013.01); *C08L 79/08* (2013.01); *B29C 65/1406* (2013.01); *B32B 7/06* (2013.01); *B32B 38/0004* (2013.01); *C08G 73/105* (2013.01); *C08G 73/1067* (2013.01); *C08G 73/1071* (2013.01); *B29C 66/41* (2013.01); *B29C 66/9141* (2013.01); *B29C 66/91445* (2013.01); *B29C 59/14* (2013.01); *B29C 2035/0827* (2013.01); *B32B 38/0008* (2013.01); *B32B 2315/08* (2013.01); *B32B 2379/08* (2013.01); *B29C 66/9121* (2013.01); *B29C 66/91216* (2013.01); *B29C 66/91311* (2013.01); *B29C 66/91313* (2013.01); *B29C 66/91315* (2013.01)
USPC ...................... 428/195.1; 428/201; 428/474.4

(58) Field of Classification Search
CPC .................................................... B32B 2379/08
USPC ........................................................ 428/195.1
See application file for complete search history.

(56) References Cited

U.S. PATENT DOCUMENTS

| | | | |
|---|---|---|---|
| 5,670,262 A | 9/1997 | Dalman | |
| 5,741,585 A | 4/1998 | Harris et al. | |
| 5,985,969 A | 11/1999 | Harris et al. | |
| 2011/0207328 A1* | 8/2011 | Speakman | 438/694 |
| 2012/0171454 A1* | 7/2012 | Kondo | 428/220 |

FOREIGN PATENT DOCUMENTS

| | | |
|---|---|---|
| JP | H06-56992 A | 3/1994 |
| JP | H11-504369 A | 4/1999 |
| JP | H11-505184 A | 5/1999 |
| JP | 2008-019348 A | 1/2008 |
| JP | 2008-159935 A | 7/2008 |
| JP | 2009-260387 A | 11/2009 |
| JP | 2010-283262 A | 12/2010 |
| JP | 2011-011455 A | 1/2011 |
| WO | WO 2010-071145 A1 | 6/2010 |

OTHER PUBLICATIONS

Japanese Patent Office, International Search Report in International Patent Application No. PCT/JP2012/060020 (Jul. 10, 2012).

* cited by examiner

*Primary Examiner* — Elizabeth Mulvaney
(74) *Attorney, Agent, or Firm* — Leydig, Voit & Mayer, Ltd.

(57) ABSTRACT

The invention provides a laminate of a substrate, a polyimide film, and a coupling treatment layer interposed therebetween, which provides different delamination strengths between the substrate and the polyimide film to form a prescribed pattern. The invention also provides a method for producing such a laminate formed from at least a substrate and a polyimide film, whereby, using a film obtained by plasma treatment of at least the surface facing the substrate as the polyimide film, coupling agent treatment is performed on at least one of the surfaces facing the substrate and the polyimide film to form a coupling treatment layer, deactivation treatment is performed on a portion of the coupling treatment layer to form a predetermined pattern, and then pressing and heating are performed with the substrate and polyimide film overlapping.

16 Claims, 7 Drawing Sheets

Fig.1
(1)
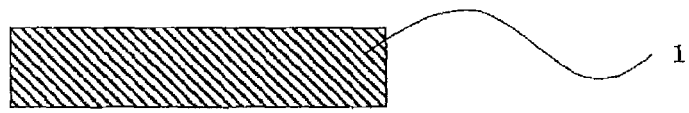
(2)
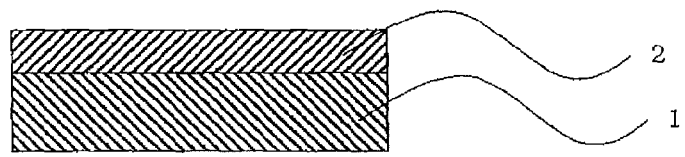
(3)
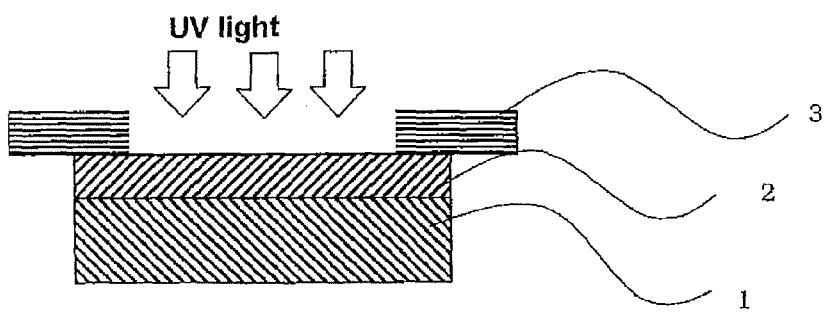
(4)
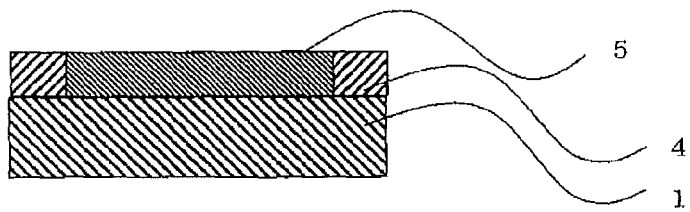
(5)
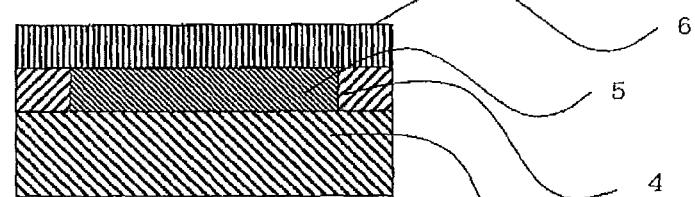
(6)
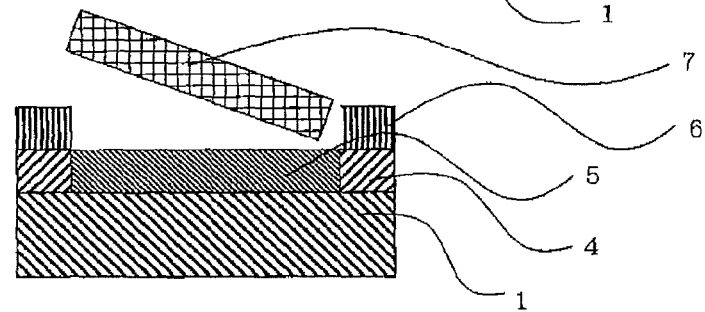

Fig.3
(1)
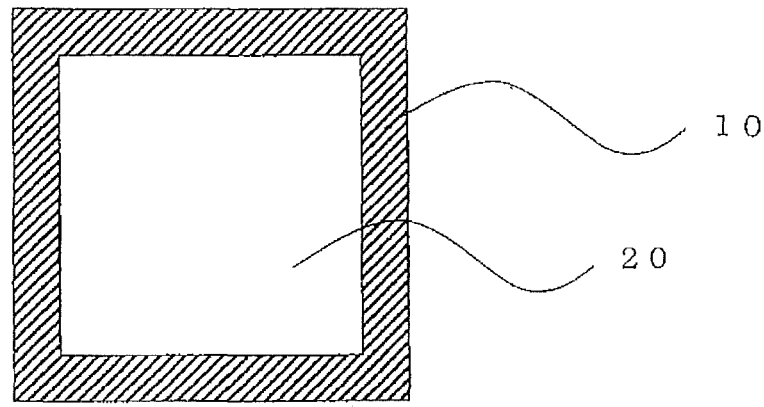
(2)
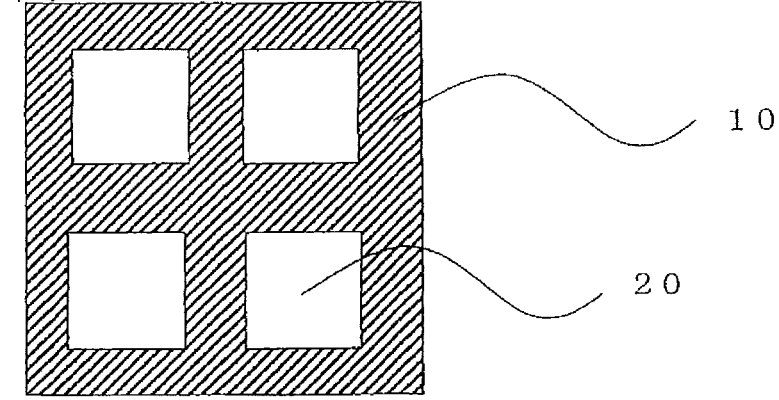
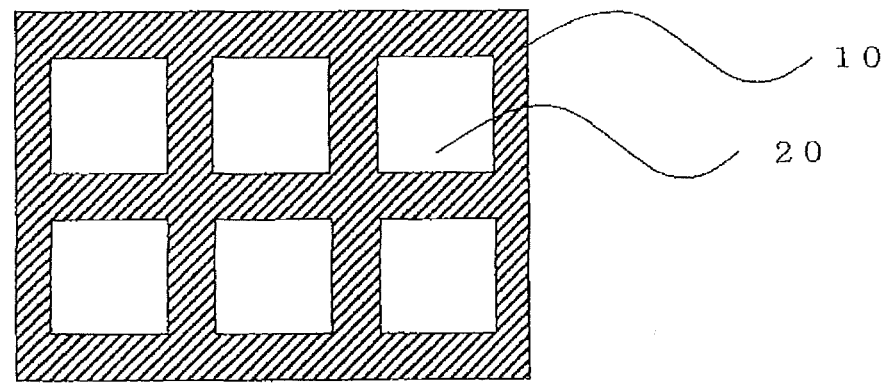

Fig.4
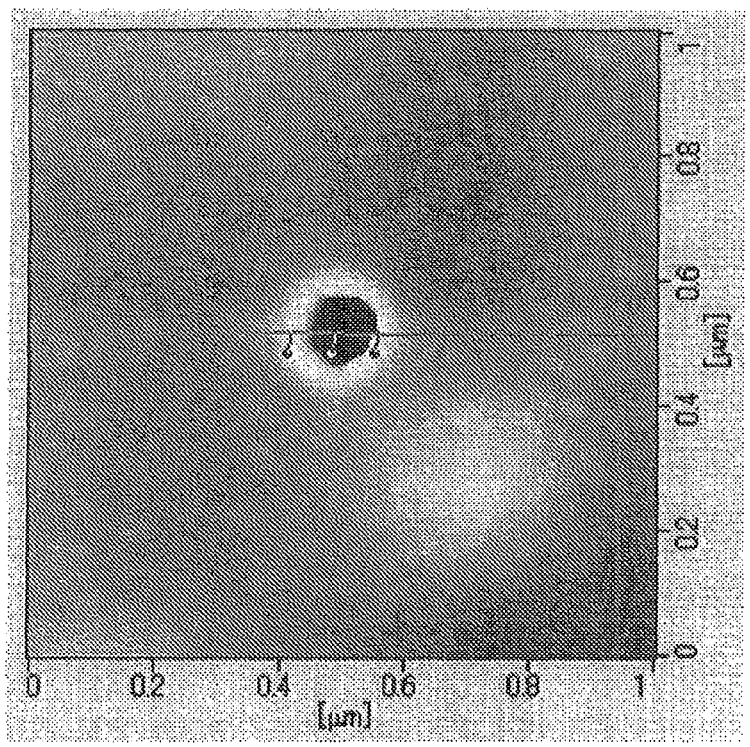
[Fig.5]
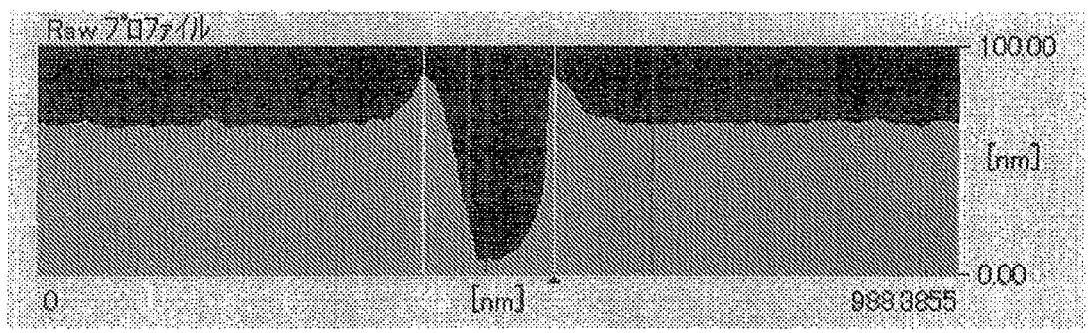

Fig. 7
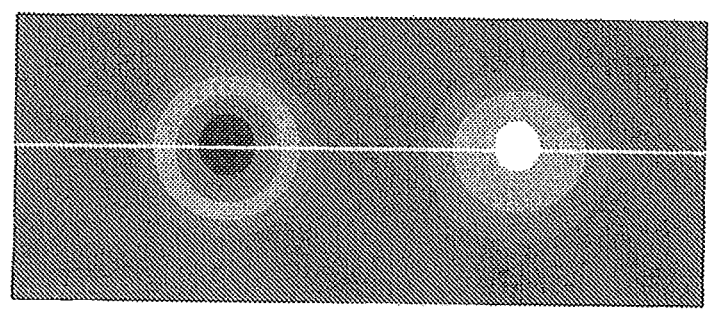
(1)
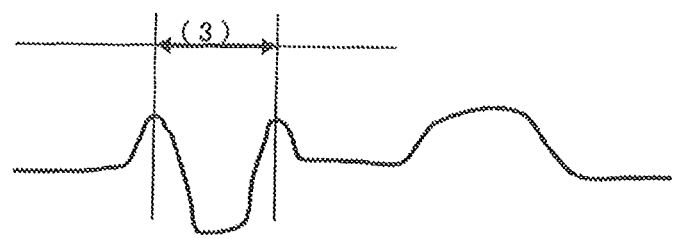
(2)

Fig.8
(1)
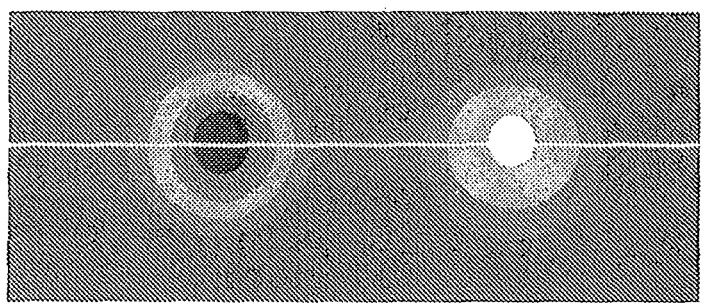
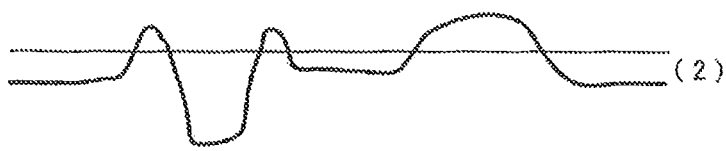
(2)
(3)
(4)
(5)
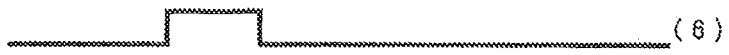
(6)

LAMINATE, METHOD FOR PRODUCING SAME, AND METHOD FOR PRODUCING DEVICE STRUCTURE USING SAME

CROSS-REFERENCE TO RELATED APPLICATIONS

This patent application is the U.S. national phase of International Patent Application No. PCT/JP2012/060020, filed Apr. 12, 2012, which claims the benefit of Japanese Patent Application No. 2011-091040, filed on Apr. 15, 2011, and Japanese Patent Application No. 2011-239766, filed on Oct. 31, 2011, which are incorporated by reference in their entireties herein.

TECHNICAL FIELD

The present invention relates to a method for producing a laminate constituted of a polyimide film and a substrate made of an organic substance (hereinafter, may be referred to simply as "substrate"). Specifically, the present invention relates to a method for producing a laminate by temporarily or semipermanently sticking a polyimide film to an inorganic basal plate as a substrate, and the laminate is useful at the time of forming a device such as a semiconductor device, a MEMS device, or a display device, which is made of a thin film and requires fine processing, on a polyimide film surface. More specifically, the laminate according to the present invention is a laminate constituted of a thin polyimide film excellent in heat resistance and insulation properties and a substrate made of an inorganic substance (e.g., one kind selected from a glass plate, a ceramic plate, a silicon wafer, and a metal plate) having a coefficient of thermal expansion which is substantially the same as that of the polyimide film, the laminate being usable for mounting a very fine circuit thereon, and being excellent in dimensional stability as well as heat resistance and insulation properties. Accordingly, the present invention relates such a laminate, a method for producing the same, and a method for producing a device structure using the laminate.

BACKGROUND ART

In recent years, aiming to make functional devices such as a semiconductor device, a MEMS device, and a display device, lightweight, compact and thin, and flexible, techniques for forming these devices on a polymer film have actively been developed. For example, as a material for a base of electronic parts such as information and communication equipments (broadcast equipment, mobile radio equipment, portable communication equipment, etc.), radars, and high speed information processing equipments, ceramics having heat resistance and being capable of dealing with high frequency in a signal band (reaching GHz band) for information and communication equipments have conventionally been used; however, ceramics are not flexible, hard to be made thin, and therefore there is a disadvantage that the fields for which ceramics are applicable are limited.

In the case of forming a functional device such as a semiconductor device, a MEMS device, or a display device on a polymer film surface, it is supposed to be ideal that the processing utilizing flexibility, a characteristic of a polymer film, so-called roll-to-roll processing is employed for the processing. However, in semiconductor industries, MEMS industries, and display industries, processing techniques for rigid flat basal plates such as a wafer base and a glass substrate base have been established so far. Therefore, as a realistic selection, it is supposed to be possible that a polymer film is stuck to a rigid substrate made of an inorganic substance, for example, a glass plate, a ceramic plate, a silicon wafer, or a metal plate; a desired device is formed; and thereafter, the polymer film is peeled from the substrate; and thereby a functional device formed on the polymer film is obtained by utilizing existing infrastructure.

Conventionally, it has been widely carried out that a polymer film is stuck to a substrate made of an inorganic substance by using a pressure-sensitive adhesive or an adhesive (Patent Document 1). However, in the case of forming a desired functional device on a laminate formed by sticking a polymer film and a substrate made of an inorganic substance, the laminate is required to have surface smoothness, dimensional stability, cleanness, durability to processing temperature, resistance to chemical solution to be used for fine processing, etc., high enough to carry out the formation of the functional device. Particularly, in formation of a functional device such as polysilicon and oxide semiconductors, processing in a temperature range of about 200 to 500° C. is required. For example, in fabrication of a low temperature polysilicon thin film transistor, heating treatment at 450° C. for about 2 hours for dehydrogenation is may be required and in formation of a hydrogenated amorphous silicon thin film, it may be possible that the film is exposed to a temperature of about 200° C. to 300° C., In the case where the functional device formation temperature is as high as described above, not only the polymer film is required to have high heat resistance but also the bonding surface between the polymer film and the substrate (that is, an adhesive or a pressure-sensitive adhesive for bonding) needs to withstand the processing temperature. However, since conventional adhesives and pressure-sensitive adhesives for bonding do not have sufficient heat resistance, they are not currently applicable in the case where the functional device formation temperature is high.

Further, among semiconductor thin films, in the case of forming a Si thin film with a very low coefficient of thermal expansion as low as about 3 ppm/° C. on a polymer film, if the difference between the coefficient of thermal expansion of the film and that of the thin film is high, the stress is accumulated in the thin film and it results in problems of causing deterioration in performance, warping and peeling. Particularly, in the case where high temperature is applied during the thin film formation process, the stress attributed to the difference between the coefficient of thermal expansion of the film and that of the thin film becomes significant during temperature change.

As the polymer film to be stuck to the substrate made of an inorganic substance, films with a low melting point is not suitable in terms of heat resistance, and polymer films made of polyethylene naphthalate, polyethylene terephthalate, polyimide, and polytetrafluoroethylene, glass fiber-reinforced epoxy, and the like are used. Particularly, a film made of a polyimide is provided with advantages such that the film is excellent in heat resistance, is also tough, and therefore is capable of being formed into a thin film. However, a polyimide film generally has a high coefficient of thermal expansion, shows considerable dimensional change owing to temperature change, and thus has a problem that it is difficult to use the film for producing a circuit having fine wiring, etc., and is limited in the fields of using the film. Accordingly, a device using a polyimide film with sufficient physical properties as a basal plate provided with heat resistance, high mechanical physical properties, and flexibility has not been obtained yet.

As a polyimide film with high tensile elasticity, a polyimide-benzoxazole film made of a polyimide having a benzoxazole ring in the main chain has been proposed (Patent Document 2). Further, a printed circuit board having this polyimide-benzoxazole film as a dielectric layer has been also proposed (Patent Document 3 and Patent Document 4). However, the polyimide-benzoxazole film made of a polyimide having a benzoxazole ring in the main chain is made to have improved tensile strength at break and tensile elasticity, and further a coefficient of thermal expansion in a satisfactory range; however, contrarily to the excellent mechanical properties, it becomes difficult to handle the film as the film is made thinner, and the film has a problem that the mechanical and dynamic properties are insufficient, etc.

It has also been tried to form other structurally-reinforced materials by forming an adhesive layer such as a thermoplastic resin on the polyimide film. However, although providing satisfactory improvement in terms of rigidity, the trial tends to sacrifice the valuable heat resistance of the polyimide film because of the low heat resistance of the thermoplastic resin or the like as an adhesive layer. Moreover, a thermoplastic resin generally has a high coefficient of thermal expansion and thinning of this layer is limited so that the thermoplastic resin tends to cause an adverse effect on the dimensional stability at the time of heating.

On the other hand, as a flexible display apparatus using a resin basal plate, there is disclosed fabrication of a flexible display apparatus using a resin basal plate, the fabrication including the steps of: forming the resin basal plate on a fixed basal plate with an amorphous silicon film as a release layer interposed therebetween; forming at least a TFT device on the resin basal plate; and peeling the resin basal plate from the fixed basal plate through the amorphous silicon film by irradiating the amorphous silicon film with laser beams (Patent Document 5). However, at the time of peeling, laser irradiation or etching means needs to be used to the adhesive layer, and the steps are thus complicated, resulting in high cost.

In addition, it is known that adhesion of polymer films is performed by UV irradiation, and disclosed that use of a coupling agent at this time is effective (Patent Document 6). However, this technique persistently relates to adhesion of polymer films, but do not relate to control of the adhesion peel force of the coupling agent itself by UV irradiation.

PRIOR ART DOCUMENT

Patent Documents

Patent Document 1: JP-A-2008-159935
Patent Document 2: JP-A-06-056992
Patent Document 3: JP-T-11-504369
Patent Document 4: JP-T-11-505184
Patent Document 5: JP-A-2009-260387
Patent Document 6: JP-A-2008-19348

SUMMARY OF THE INVENTION

Problems to be Solved by the Invention

The present invention has been made focusing on the above-mentioned circumstances, and an object thereof is to provide a laminate of a polyimide film serving as a base for laminating a variety of devices, and a substrate, wherein the laminate is not peeled even in high temperature process during device fabrication, and further the polyimide film can be easily peeled from the substrate after a device has been fabricated on the polyimide film.

Solutions to the Problems

The present inventors have made intensive investigations for solving the above-mentioned problems, and consequently have found that at least one of surfaces of the substrate and the polyimide film facing to each other is subjected to a coupling agent treatment to form a coupling treatment layer, thereby capable of being adhesion of both the substrate and the polyimide film, and thereafter the coupling treatment layer is partially inactivated to form a prescribed pattern, thereby forming good adhesion parts and easily peeling parts different in delamination strength so that delamination strength so sufficient as to cause no peeling even in high temperature process at the time of fabricating devices in the good adhesion part is exhibited, and a device-bearing polyimide film can be easily peeled from the substrate by forming a notch in the easily peeling part after device fabrication, and therefore the present invention has been completed.

That is, the present invention includes the following configurations.

1) A method for producing a laminate composed of at least a substrate and a polyimide film, the method comprising: using as the polyimide film a film having at least a surface subjected to plasma treatment and to be made opposite to the substrate; performing coupling agent treatment on at least one of the opposite surfaces of the substrate and the polyimide film to form a coupling treatment layer; carrying out inactivation treatment of a portion of the coupling treatment layer to form a prescribed pattern; and laying the polyimide film on the substrate, followed by pressurizing and heating treatment.

2) The method for producing a laminate according to the said 1), wherein at least one kind treatment selected from the group consisting of blast treatment, vacuum plasma treatment, atmospheric pressure plasma treatment, corona treatment, active radiation irradiation treatment, active gas treatment, and chemical liquid treatment is carried out as the inactivation treatment.

3) The method for producing a laminate according to the said 2), wherein at least UV irradiation treatment is carried out as the inactivation treatment.

4) The method for producing a laminate according to any of the said 1) to 3), wherein the pressurizing and heating treatment is carried out using a roll.

5) The method for producing a laminate according to any of the said 1) to 4), wherein the pressurizing and heating treatment is carried out in vacuum.

6) The method for producing a laminate according to any of the said 1) to 5), wherein the pressurizing and heating treatment is carried out separately in pressurizing process and heating process by pressurizing at a temperature lower than 120° C. and then heating at a temperature of 120° C. or higher under low pressure or normal pressure.

7) The method for producing a laminate according to any of the said 1) to 6), wherein a film treated with acid treatment after the plasma treatment is used as the polyimide film.

8) The method for producing a laminate according to any of the said 1) to 7), wherein a film obtained by reaction of diamines containing an aromatic diamine having a benzoxazole structure and tetracarboxylic acids is used as the polyimide film.

9) A laminate comprising a substrate, a polyimide film, and a coupling treatment layer interposed therebetween, wherein delamination strength between the substrate and the polyimide film is different between good adhesion parts and easily peeling parts, forming a prescribed pattern.

10) The laminate according to the said 9), wherein 180-degree peel strength between the substrate and the polyimide film in the easily peeling part is ½ or lower of 180-degree peel strength between the substrate and the polyimide film in the good adhesion part.

11) The laminate according to the said 9) or 10), wherein the polyimide film is a film obtained by reaction of diamines containing an aromatic diamine having a benzoxazole structure and tetracarboxylic acids.

12) A method for producing a structure having a device formed on a polyimide film, the method comprising: using a laminate having a substrate and a polyimide film as set forth in any of the said 9) to 11); forming a device on the polyimide film of the laminate; making a cut in the polyimide film at an easily peeling part of the laminate; and peeling the polyimide film from the substrate.

Effects of the Invention

The laminate obtained by the production method of the present invention is a laminate obtained by sticking one surface of a substrate (a glass plate, a ceramic plate, a silicon wafer, a metal, etc.) and one surface of a polyimide film without an adhesive layer interposed therebetween, and the substrate, and good adhesion parts and easily peeling parts different in adhesion delamination strength of the polyimide film are separated in a previously determined pattern, and therefore it is made possible to easily obtain a device-bearing polyimide film by forming a notch in the polyimide film at the easily peeling part and peeling the polyimide film after a device is fabricated on the polyimide film.

According to the present invention, a circuit or the like can be formed on a thin polyimide film having insulation properties, flexibility, as well as heat resistance. Further, at the time of fabricating an electronic device by mounting electronic parts, even in the case of a thin polyimide film, the polyimide film is laminated and fixed on a substrate excellent in dimensional stability, and therefore highly precise positioning can be performed and multilayered thin film fabrication and circuit formation can be carried out. Further, the laminate of the present invention is not peeled even if heat is applied during the process, and at the time of peeling from the substrate based on the necessity after device fabrication, the peeling of the polyimide film from the substrate can be smoothly performed. Since the laminate of the present invention is a laminate having delamination strength enough to cause no peeling in the process transfer steps, conventional electronic device fabrication processes can be employed as they are. Particularly, at the time of fabricating a device on the polyimide film, adhesion is excellent and smoothness is also excellent owing to the surface properties of the polyimide film, and therefore device fabrication can be performed stably and precisely. Accordingly, the laminate of the present invention is extremely significant for fabricating an electronic device or the like where a circuit or the like is formed on a thin polyimide film having insulation properties, flexibility, as well as heat resistance.

According to the present invention, plasma treatment and acid treatment may also be applied to an original polyimide film. The steps for these treatments can be carried out by roll-to-roll process and the treatments can be carried out efficiently. Particularly, a polyimide film roll subjected up to the plasma treatment contains a lubricant, and therefore has a handling property in the form of a roll which is the same as that before plasma treatment. Regarding roll transportation after the acid treatment, the roll transportation is made easy by attaching a protection film coated with a pressure-sensitive adhesive to the surface opposite to the surface which is subjected to the acid treatment. The surface opposite to the surface which is subjected to the acid treatment becomes a surface on which device fabrication is carried out, and therefore a protection film may be stuck in order to prevent scratching or the like so that it does not result in an increase in steps, and since the protection film has a lubricant, roll transportation is performed without any problem at all. As the configuration of another step, it is also possible to carry out plasma treatment on the polyimide film in the form of a roll, to cut the polyimide film into cut sheets, and then to carry out acid treatment, and therefore the treatments can be also carried out simply. The fact that the treatments are excellent in productivity is significant in terms of execution.

The laminate of the present invention is supported by the substrate made of a heat resistant inorganic substance, and therefore multilayer thin film fabrication, circuit formation, or the like can be performed by precise positioning at the time of circuit wiring fabrication and semiconductor formation, and thin film deposition or the like can be carried out without peeling even in high temperature process at the time of semiconductor fabrication. Further, this laminate can be easily peeled in the case of peeling only the easily peeling parts of the pattern after semiconductor attachment, and therefore the fabricated semiconductor is not broken. A polyimide film to which a circuit-bearing device is attached and a polyimide film to which a semiconductor-bearing device having a semiconductor device is attached can be provided by peeling the circuit-bearing laminate and a polyimide film laminate used for a semiconductor-bearing laminate on which the semiconductor device is formed.

At the time of circuit wiring fabrication, if a polyimide film inferior in dimensional stability and causing significant shape change is used solely as a basal plate in the case where a multilayer thin film is fabricated or a circuit formation is carried out by precise positioning, the positioning for device fabrication becomes difficult. To the contrary, in the method of the prevent invention using a polyimide film fixed on a rigid substrate excellent in dimensional stability and peeled from the rigid substrate after device fabrication, positioning for device fabrication is easy and conventional electronic device fabrication process can be employed as it is and device fabrication on the polyimide film can be stably and precisely carried out. Particularly, the laminate of the present invention is a laminate significantly useful in the case where circuit formation or the like is carried out at high temperature and for precise circuit formation.

In the case of solar cells using single crystalline and polycrystalline Si, etc., there are problems of easiness of cracking, handling difficulty in process, and durability after production completion while thinning of the cells proceeds, but these problems can be solved by using a polyimide film used as a basal plate in the form of a laminate with a substrate likewise the present invention. Further, there are parts which are peeled easily at that time, and therefore a reinforced basal plate from which electrodes can be drawn can be fabricated.

Further, in the case, for example, where a wafer is used as a substrate and a polyimide film is formed by applying a polyimide varnish onto the wafer and thereafter peeling the varnish, there are problems that concentric film thickness distribution is formed on the wafer; that the formed polyimide film is warped when being peeled because of difference of the structure between the surface and the rear surface of the polyimide film; and that the peeling of the polyimide film from the substrate itself is difficult since the adhesion strength of the polyimide film and the wafer is too high and the polyimide film is fragile, and the film is often damaged at the time of peeling. To the contrary, in the case where a separately fabricated film is stuck likewise the present invention, the film thickness is extremely uniform in a narrow surface area of a substrate such as a wafer or glass, and it is possible to stick the film after a circuit is previously fabricated or to fabricate a circuit after the film is stuck, and the present invention is suitable for circuit fabrication.

BRIEF DESCRIPTION OF THE DRAWINGS

FIG. 1 is a schematic view showing one embodiment of a method for producing a laminate of the present invention.

FIG. 3 is a schematic structure showing a pattern example.

FIG. 4 is an AFM image showing a crater part.

FIG. 5 is a cross-sectional AFM image showing a linear part of the crater part shown in FIG. 4.

FIG. 7 is a view for illustrating a method for measuring the diameter of the crater part.

FIG. 8 is a view for illustrating a method for measuring the number of crater parts.

Figure 2:
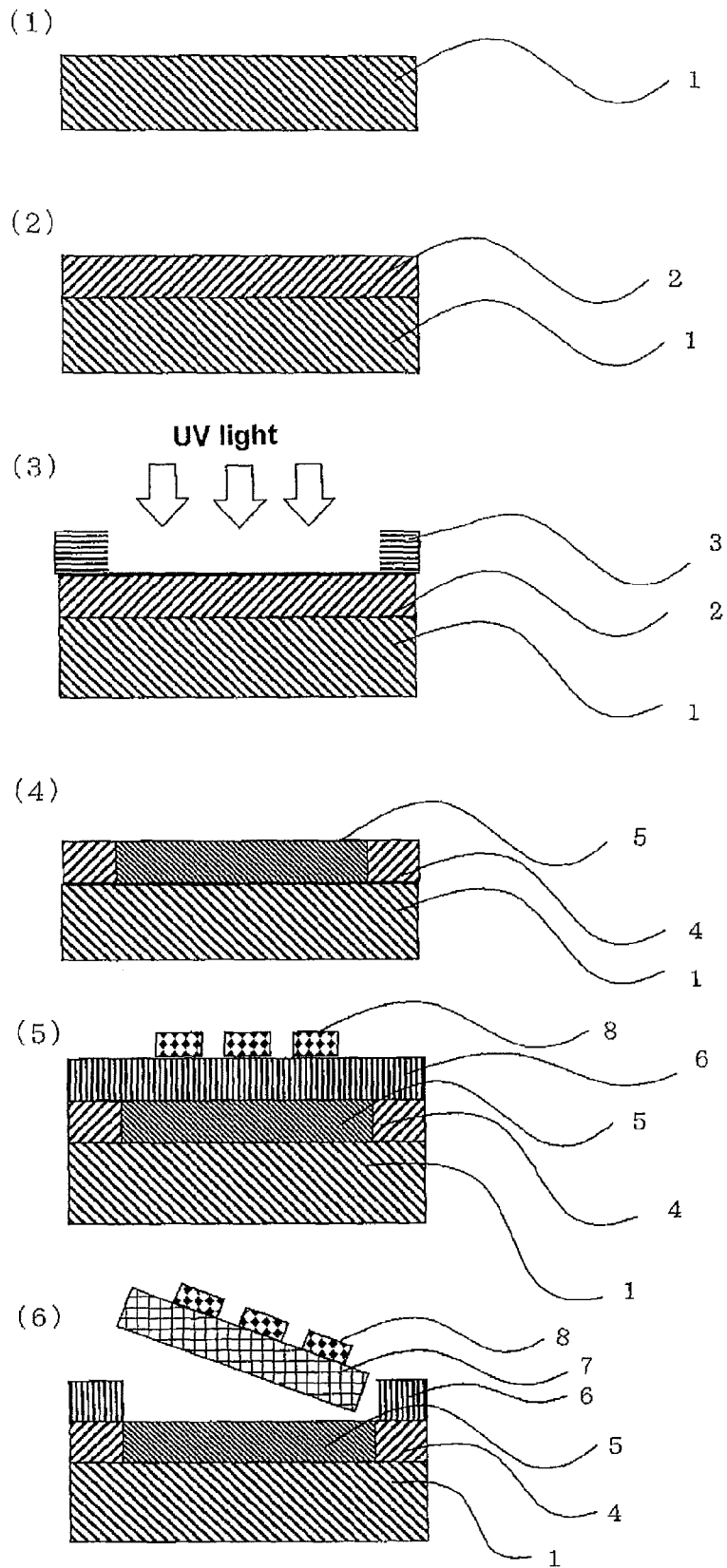
FIG. 2 is a schematic view showing one embodiment of a method for producing a device structure of the present invention.

MODE FOR CARRYING OUT THE INVENTION (Method for Producing Laminate)

The method for producing a laminate of the present invention is a method for producing a laminate constituted by using at least a substrate and a polyimide film.

<Substrate>

The substrate in the present invention may be a plate-like substrate which is made of an inorganic substance and usable as a basal plate, and examples thereof include plates mainly constituted of a glass plate, a ceramic plate, a silicon wafer, and a metal as well as composites obtained by laminating the glass plate, ceramic plate, silicon wafer, and metal, obtained by dispersing these materials, and obtained by adding fibers of these materials.

The glass plate includes quartz glass, high silicate glass (96% silica), soda-lime glass, lead glass, aluminoborosilicate glass, borosilicate glass (Pyrex (registered trademark)), borosilicate glass (alkali-free), borosilicate glass (micro-sheet), aluminosilicate glass, etc. Above all, those having a coefficient of thermal expansion of 5 ppm/° C. or lower are desirable and examples thereof desirable as commercialized products are "Corning 7059", "Corning 1737", and "EAGLE" manufactured by Corning Incorporated, which are glasses for liquid crystal; "AN 100" manufactured by Asahi Glass Co., Ltd.; "OA10" manufactured by Nippon Electric Glass Co., Ltd.; "AF32" manufactured by SCHOTT; and the like.

The ceramic plate includes ceramics for basal plates such as $Al_2O_3$, mullite, AlN, SiC, $Si_3N_4$, BN, crystallized glass, cordierite, spodumene, Pb-BSG+CaZrO$_3$+Al$_2$O$_3$, crystallized glass+$Al_2O_3$, crystallized Ca-BSG, BSG+Quartz, BSG+Quartz, BSG+$Al_2O_3$, Pb+BSG+$Al_2O_3$, glass-ceramic, and Zerodur; capacitor materials such as $TiO_2$, strontium titanate, calcium titanate, magnesium titanate, alumina, MgO, steatite, $BaTi_4O_9$, $BaTiO_3$, $BaTi_4{}^+CaZrO_3$, BaSrCaZrTiO$_3$, Ba(TiZr)O$_3$, PMN-PT, and PFN-PFW; piezoelectric materials such as $PbNb_2O_6$, $Pb_{0.5}Be_{0.5}Nb_2O_6$, $PbTiO_3$, $BaTiO_3$, PZT, 0.855PZT-95PT-0.5BT, 0.873PZT-0.97PT-0.3BT, and PLZT; and the like.

The silicon wafer includes all of n-type and p-type doped silicon wafers, intrinsic silicon wafers, etc., and also includes silicon wafers obtained by depositing a silicon oxide layer and a variety of thin films on silicon wafers, and besides a silicon wafer, germanium, silicon-germanium, gallium-arsenic, aluminum-gallium-indium, nitrogen-phosphorus-arsenic-antimony are well employed. Further, widely-used semiconductor wafers such as InP (indium-phosphorus), InGaAs, GaInNAs, LT, LN, ZnO (zinc oxide), CdTe (cadmium-tellurium), and ZnSe (zinc selenide) are also included.

The metal includes single metals such as W, Mo, Pt, Fe, Ni, and Au; and alloys such as Inconel, Monel, Nimonic, carbon copper, Fe—Ni-based invar alloy, and super-invar alloy. Further, multilayer metal plates obtained by adding other metal layers or ceramic layers to these metals are also included. In this case, if CTE of the entire body with the added layers is low, Cu, Al and the like may be used for the main metal layer. A metal to be used for an added metal layer is not particularly limited if the metal has properties such that the adhesion to the polyimide film is reinforced, no dispersion is caused and chemical resistance or heat resistance is excellent, but preferable examples thereof include chromium, nickel, TiN, and Mo-containing Cu.

The plane part of the substrate is desirably sufficient flat. Concretely, the surface roughness has a P-V value of 50 nm or lower, more preferably 20 nm or lower, and furthermore preferably 5 nm or lower. If the surface roughness is rougher than the above range, the delamination strength of the polyimide film and the substrate may possibly become insufficient.

<Polyimide Film>

Generally, a polyimide film is obtained by applying a polyamide acid solution (referred to as "polyimide precursor solution") obtained by reaction of at least diamines and tetracarboxylic acids in a solvent to a substrate for polyimide film fabrication; drying the applied solution to form a green film (referred to as "precursor film" or "polyamide acid film"); and subjecting the green film to high temperature heat treatment on the substrate for polyimide film fabrication or in the state where the green film is peeled from the substrate to allow to perform dehydration ring-closing reaction. Herein, the substrate for polyimide film fabrication is different from the "substrate" as the constituent member of the laminate of the present invention.

The diamines constituting the polyamide acid are not particularly limited, and aromatic diamines, aliphatic diamines, alicyclic diamines, and the like commonly used for polyimide synthesis can be used. In terms of heat resistance, aromatic diamines are preferable, and an aromatic diamine having a benzoxazole structure is more preferable. Use of the aromatic diamine having a benzoxazole structure can provide high heat resistance, high elastic modulus, low heat shrinkage, and low coefficient of thermal expansion. The diamines may be used alone or two or more thereof may be used in combination.

The aromatic diamine having a benzoxazole structure is not particularly limited, and examples thereof include 5-amino-2-(p-aminophenyl)benzoxazole, 6-amino-2-(p-aminophenyl)benzoxazole, 5-amino-2-(m-aminophenyl)benzoxazole, 6-amino-2-(m-aminophenyl)benzoxazole, 2,2'-p-phenylenebis(5-aminobenzoxazole), 2,2'-p-phenylenebis(6-aminobenzoxazole), 1-(5-aminobenzoxazolo)-4-(6-aminobenzoxazolo)benzene, 2,6-(4,4'-diaminodiphenyl)benzo[1,2-d:5,4-d']bisoxazole, 2,6-(4,4'-diaminodiphenyl)benzo[1,2-d:4,5-d']bisoxazole, 2,6-(3,4'-diaminodiphenyl)benzo[1,2-d:5,4-d']bisoxazole, 2,6-(3,4'-diaminodiphenyl)benzo[1,2-d:4,5-d']bisoxazole, 2,6-(3,3'-diaminodiphenyl)benzo[1,2-d:5,4-d']bisoxazole, 2,6-(3,3'-diaminodiphenyl)benzo[1,2-d:4,5-d']bisoxazole, and the like.

Among them, in terms of easiness for synthesis, the respective isomers of amino(aminophenyl)benzoxazole are preferable and 5-amino-2-(p-aminophenyl)benzoxazole is more preferable. Herein, the "respective isomers" means amino(aminophenyl)benzoxazole in which two amino groups are different at bonding positions. For example, 5-amino-2-(p- aminophenyl)benzoxazole, 6-amino-2-(p-aminophenyl)benzoxazole, 5-amino-2-(m-aminophenyl)benzoxazole, and 6-amino-2-(m-aminophenyl)benzoxazole are isomers.

In the case where the diamines include an aromatic diamine having a benzoxazole structure, the use amount of the aromatic diamine having a benzoxazole structure is preferably 70 mol % or higher, and more preferably 75 mol % or higher in the total diamines.

Besides the diamine having a benzoxazole structure, the diamines may include other diamines exemplified as follows. Examples of the other diamines include 2,2'-dimethyl-4,4'-diaminobiphenyl, bisaniline, 1,4-bis(4-amino-2-trifluoromethylphenoxy)benzene, 2,2'-ditrifluoromethyl-4,4'-diaminobiphenyl, 4,4'-bis(4-aminophenoxy)biphenyl, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfone, 2,2-bis[4-(3-aminophenoxy)phenyl]propane, 2,2-bis[4-(3-aminophenoxy)phenyl]-1,1,1,3,3,3-hexafluoropropane, m-phenylenediamine, o-phenylenediamine, p-phenylenediamine, m-aminobenzylamine, p-aminobenzylamine, 3,3'-diaminodiphenyl ether, 3,4'-diaminodiphenyl ether, 4,4'-diaminodiphenyl ether, 3,3'-diaminodiphenyl sulfide, 3,3'-diaminodiphenyl sulfoxide, 3,4'-diaminodiphenyl sulfoxide, 4,4'-diaminodiphenyl sulfoxide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(4-aminophenoxy)phenyl]methane, 1,1-bis[4-(4-aminophenoxy)phenyl]ethane, 1,2-bis[4-(4-aminophenoxy)phenyl]ethane, 1,1-bis[4-(4-aminophenoxy)phenyl]propane, 1,2-bis[4-(4-aminophenoxy)phenyl]propane, 1,3-bis[4-(4-aminophenoxy)phenyl]propane, 2,2-bis[4-(4-aminophenoxy)phenyl]propane, 1,1-bis[4-(4-aminophenoxy)phenyl]butane, 1,3-bis[4-(4-aminophenoxy)phenyl]butane, 1,4-bis[4-(4-aminophenoxy)phenyl]butane, 2,2-bis[4-(4-aminophenoxy)phenyl]butane, 2,3-bis[4-(4-aminophenoxy)phenyl]butane, 2-[4-(4-aminophenoxy)phenyl]-2-[4-(4-aminophenoxy)-3-methylphenyl]propane, 2,2-bis[4-(4-aminophenoxy)-3-methylphenyl]propane, 2-[4-(4-aminophenoxy)phenyl]-2-[4-(4-aminophenoxy)-3,5-dimethylphenyl]propane, 2,2-bis[4-(4-aminophenoxy)-3,5-dimethylphenyl]propane, 2,2-bis[4-(4-aminophenoxy)phenyl]-1,1,1,3,3,3-hexafluoropropane, 1,4-bis(3-aminophenoxy)benzene, 1,3-bis(3-aminophenoxy)benzene, 1,4-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfide, bis[4-(4-aminophenoxy)phenyl]sulfoxide, bis[4-(4-aminophenoxy)phenyl]sulfone, bis[4-(3-aminophenoxy)phenyl]ether, bis[4-(4-aminophenoxy)phenyl]ether, 1,3-bis[4-(4-aminophenoxy)benzoyl]benzene, 1,3-bis[4-(3-aminophenoxy)benzoyl]benzene, 1,4-bis[4-(3-aminophenoxy)benzoyl]benzene, 4,4'-bis[(3-aminophenoxy)benzoyl]benzene, 1,1-bis[4-(3-aminophenoxy)phenyl]propane, 1,3-bis[4-(3-aminophenoxy)phenyl]propane, 3,4'-diaminodiphenyl sulfide, 2,2-bis[3-(3-aminophenoxy)phenyl]-1,1,1,3,3,3-hexafluoropropane, bis[4-(3-aminophenoxy)phenyl]methane, 1,1-bis[4-(3-aminophenoxy)phenyl]ethane, 1,2-bis[4-(3-aminophenoxy)phenyl]ethane, bis[4-(3-aminophenoxy)phenyl]sulfoxide, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, bis[4-{4-(4-aminophenoxy)phenoxy}phenyl]sulfone, 1,4-bis[4-(4-aminophenoxy)phenoxy-α,α-dimethylbenzyl]benzene, 1,3-bis[4-(4-aminophenoxy)phenoxy-α,α-dimethylbenzyl]benzene, 1,3-bis[4-(4-amino-6-trifluoromethylphenoxy)-α,α-dimethylbenzyl]benzene, 1,3-bis[4-(4-amino-6-fluorophenoxy)-α,α-dimethylbenzyl]benzene, 1,3-bis[4-(4-amino-6-methylphenoxy)-α,α-dimethylbenzyl]benzene, 1,3-bis[4-(4-amino-6-cyanophenoxy)-α,α-dimethylbenzyl]benzene, 3,3'-diamino-4,4'-diphenoxybenzophenone, 4,4'-diamino-5,5'-diphenoxybenzophenone, 3,4'-diamino-4,5'-diphenoxybenzophenone, 3,3'-diamino-4-phenoxybenzophenone, 4,4'-diamino-5-phenoxybenzophenone, 3,4'-diamino-4-phenoxybenzophenone, 3,4'-diamino-5'-phenoxybenzophenone, 3,3'-diamino-4,4'-dibiphenoxybenzophenone, 4,4'-diamino-5,5'-dibiphenoxybenzophenone, 3,4'-diamino-4,5'-dibiphenoxybenzophenone, 3,3'-diamino-4-biphenoxybenzophenone, 4,4'-diamino-5-biphenoxybenzophenone, 3,4'-diamino-4-biphenoxybenzophenone, 3,4'-diamino-5'-biphenoxybenzophenone, 1,3-bis(3-amino-4-phenoxybenzoyl)benzene, 1,4-bis(3-amino-4-phenoxybenzoyl)benzene, 1,3-bis(4-amino-5-phenoxybenzoyl)benzene, 1,4-bis(4-amino-5-phenoxybenzoyl)benzene, 1,3-bis(3-amino-4-biphenoxybenzoyl)benzene, 1,4-bis(3-amino-4-biphenoxybenzoyl)benzene, 1,3-bis(4-amino-5-biphenoxybenzoyl)benzene, 1,4-bis(4-amino-5-biphenoxybenzoyl)benzene, 2,6-bis[4-(4-amino-α,α-dimethylbenzyl)phenoxy]benzonitrile, and aromatic diamines formed by substituting part or all of hydrogen atoms on the aromatic rings of the aromatic diamines with halogen atoms, alkyl groups or alkoxyl groups having 1 to 3 carbon atoms, cyano groups, and halo-alkyl groups or halo-alkoxy groups having 1 to 3 carbon atoms, which are formed by substituting part or all of hydrogen atoms of alkyl groups or alkoxy groups with halogen atoms. Alicyclic diamines such as 4,4'-methylenebis(2,6-dimethylcyclohexylamine) may also be used.

In the case where the other diamines are used, the use amount thereof is adjusted to preferably 30 mol % or lower, and more preferably 25 mol % or lower in the total diamines.

The tetracarboxylic acids constituting the polyamide acid are not particularly limited, and aromatic tetracarboxylic acids, aliphatic tetracarboxylic acids, alicyclic tetracarboxylic acids, acid anhydrides thereof, etc., which are commonly used for polyimide synthesis can be used. Among them, aromatic tetracarboxylic acid anhydrides and alicyclic tetracarboxylic acid anhydrides are preferable and aromatic tetracarboxylic acid anhydrides are more preferable. In the case where they are acid anhydrides, those having one or two anhydride structures in the molecule may be used, and those having two anhydride structures (dianhydrides) in the molecule are preferable. The tetracarboxylic acids may be used alone or two or more thereof may be used in combination.

Examples of the alicyclic tetracarboxylic acid anhydrides include cyclobutanetetracarboxylic acid dianhydride, 1,2,4,5-cyclohexanetetracarboxylic acid dianhydride, 3,3',4,4'-bicyclohexyltetracarboxylic acid dianhydride, and the like.

The aromatic tetracarboxylic acid anhydrides are not particularly limited and preferably those having a pyromellitic acid residue, that is, a structure derived from pyromellitic acid. Examples of such aromatic tetracarboxylic acid include pyromellitic acid dianhydride, 3,3',4,4'-biphenyltetracarboxylic acid dianhydride, 4,4'-oxydiphthalic acid dianhydride, 3,3',4,4'-benzophenonetetracarboxylic acid dianhydride, 3,3',4,4'-diphenylsulfonetetracarboxylic acid dianhydride, 2,2-bis[4-(3,4-dicarboxyphenoxy)phenyl]propanoic acid dianhydride, and the like.

The polyamide acid is particularly preferable to be constituted of the following combinations of diamines and tetracarboxylic acids.

A. A combination of an aromatic tetracarboxylic acid having a pyromellitic acid residue and an aromatic diamine having a benzoxazole structure.

B. A combination of an aromatic diamine having a phenylenediamine skeleton and an aromatic tetracarboxylic acid having a biphenyltetracarboxylic acid skeleton.

The polyamide acid may be constituted by containing tricarboxylic acids, for example, cyclohexane-1,2,4-tricarboxylic anhydride, in addition to the diamines and the tetracarboxylic acids.

The solvent to be used at the time of obtaining a polyamide acid by reaction (polymerization) of diamines and tetracarboxylic acids is not particularly limited if it can dissolve all of monomers to be raw materials and the polyamide acid to be generated, but polar organic solvents are preferable and examples thereof include N-methyl-2-pyrrolidone, N-acetyl-2-pyrrolidone, N,N-dimethylformamide, N,N-diethylformamide, N,N-dimethylacetamide, dimethyl sulfoxide, hexamethylphosphoric amide, ethylcellosolve acetate, diethylene glycol dimethyl ether, sulfolane, halophenols, and the like. Such solvents may be used alone or two or more thereof may be used in combination. The use amount of these solvents may be an amount sufficient for solving monomers to be raw materials, and a concrete use amount includes an amount such that the total amount of the monomers in the reaction solution (solution in which the monomers are dissolved) is adjusted to generally 5 to 40 mass %, and preferably 10 to 30 mass %.

The conditions for polymerization reaction to obtain a polyamide acid (hereinafter, simply referred to as "polymerization reaction") may be conventionally known conditions and, for example, the conditions may be continuous stirring and/or mixing in a temperature range of 0 to 80° C. for 10 minutes to 30 hours. If necessary, the polymerization reaction may be dividedly carried out or the reaction temperature may be changed up and down. The addition order of the monomers is not particularly limited, but it is preferable to add tetracarboxylic acids to a solution of diamines.

It is also effective to carry out vacuum defoaming during the polymerization reaction in order to produce a high quality polyamide acid solution. The polymerization may be controlled by adding a small amount of a terminal-sealing agent to the diamines before the polymerization reaction. Examples of the terminal-sealing agent include dicarboxylic acid anhydrides, tricarboxylic acid anhydrides, aniline derivatives, and the like. Concretely preferable examples among them are phthalic anhydride, maleic anhydride, 4-ethynylphthalic anhydride, 4-phenylethynylphthalic anhydride, and ethynylaniline, and maleic anhydride is particularly preferable. The use amount of the terminal-sealing agent in the case of its use is preferably 0.001 to 1.0 mol per 1 mol of the diamines.

The mass of the polyamide acid in the polyamide acid solution to be obtained by the polymerization reaction is preferably 5 to 40 mass %, and more preferably 10 to 30 mass %. From the viewpoint of stability of sending the solution, the polyamide acid solution has a viscosity of preferably 10 to 2000 Pa·s, and more preferably 100 to 1000 Pa·s in measurement (25° C.) by Brookfield viscometer.

The polyamide acid solution obtained by the polymerization reaction may further contain a variety of additives such as a defoaming agent, a leveling agent, and a flame retardant for the purpose of improving the performance of the polyimide film. A method and timing for adding the additives are not particularly limited.

In order to form a polyimide film from the polyamide acid solution obtained by the polymerization reaction, a method may be employed in which a green film (self-supporting precursor film) is obtained by applying the polyamide acid solution to a substrate for polyimide film fabrication, followed by drying; and then the green film is subjected to heat treatment to carry out imidization reaction. The application of the polyamide acid solution to the substrate may be carried out by, for example, casting from a cap with a slit, extrusion by an extruder, or the like, in addition to spin coating, doctor blade, applicator, comma coater, screen printing method, slit coating, reverse coating, dip coating, or the like, and conventionally known solution coating methods can be used properly without being limited thereto. The application amount of the polyamide acid solution may be set properly in accordance with desired thickness of the polyimide film. The heating temperature at the time of drying the applied polyamide acid solution is preferably 50° C. to 120° C., and more preferably 80° C. to 100° C. The drying time is preferably 5 minutes to 3 hours, and more preferably 15 minutes to 2 hours. The remaining solvent amount in the green film after drying is preferably 25 to 50 mass %, and more preferably 35 to 45 mass %. The temperature at the time of heat treatment for the green film is preferably 150° C. to 550° C., and more preferably 280° C. to 520° C. The heat treatment time is desirably 0.05 to 10 hours.

The polyimide film has a glass transition temperature of 250° C. or higher, preferably 300° C. or higher, and more preferably 350° C. or higher, or alternatively, has preferably no glass transition temperature observed in a range of 500° C. or lower. The glass transition temperature in the present invention is measured by differential scanning calorimetry (DSC).

The polyimide film has an average coefficient of thermal expansion from 30° C. to 300° C. of preferably −5 ppm/° C. to +20 ppm/° C., more preferably −5 ppm/° C. to +15 ppm/° C., and furthermore preferably 1 ppm/° C. to +10 ppm/° C. The difference between the coefficient of thermal expansion of the polyimide film and that of the substrate becomes high if the coefficient is out of the range, and therefore the polyimide film and the substrate made of an inorganic substance may possibly be peeled easily from each other during the heating process. In a metal or ceramics, the coefficient of thermal expansion is not often changed within the temperature range; however, the polyimide film may show a CTE change in the temperature range. Accordingly, the measurement lower limit may be changed to 0° C., 30° C., or 50° C., and the measurement upper limit may be changed to 200° C., 300° C., or 400° C. For example, in the present invention, an average value from 30° C. to 300° C. is employed as the coefficient of thermal expansion of the polyimide film; however, the temperature range focused on is changed in accordance with the use, and in consideration of process at high temperature, in the case where the coefficient of thermal expansion is investigated in a range of 30° C. to 400° C., the range may be 100° C. to 400° C.; or in consideration of reflow process, in the case where it is investigated in a range of 50° C. to 280° C., the investigation may possibly be carried out while focusing on a use temperature range of −50° C. to 150° C.

The thickness of the polyimide film in the present invention is not particularly limited, but it is preferably 1 μm to 200 μm, and more preferably 3 μm to 60 μm. The unevenness in the thickness of the polyimide film is also preferably 20% or less.

If the thickness of the polyimide film is thinner than 1 μm, it is difficult to control the thickness and peeling of the polyimide film form the substrate may possibly become difficult, and if it exceeds 200 μm, the polyimide film may possibly be folded and curled at the time of peeling the film from the substrate. Use of the polyimide film having a thickness within the range affords a considerable contribution to making devices such as a sensor high performance and making electronic parts lightweight, compact, and thin.

The polyimide film is obtained preferably in the form of a rolled long polyimide film with a width of 300 mm or longer and a length of 10 m or longer at the time of production, and more preferably in the form of a roll-type polyimide film wound on a winding core.

In order to secure the handling property and productivity of the polyimide film, lubricants (particles) are preferably added to/contained in the polyimide constituting the film to impart fine unevenness to the polyimide film surface, thereby attaining slippage.

The lubricants (particles) are fine particles made of an inorganic substance, and those usable are particles made of metals, metal oxides, metal nitrides, metal carbides, acid metal salts, phosphates, carbonates, talc, mica, clay, other clay minerals, or the like. Preferably, those usable are metal oxides, phosphates, and carbonates such as silicon oxide, calcium phosphate, calcium hydrogen phosphate, calcium dihydrogen phosphate, calcium pyrophosphate, hydroxyapatite, calcium carbonate, and glass filler. The lubricants may be used alone or two or more thereof may be used.

The lubricants (particles) have a volume average particle diameter of generally 0.001 to 10 μm, preferably 0.03 to 2.5 μm, more preferably 0.05 to 0.7 μm, and even more preferably 0.05 to 0.3 μm. The volume average particle diameter is based on the measurement value obtained by a light scattering method. If the particle diameter is smaller than the lower limit, industrial production of the polyimide film becomes difficult, and if it exceeds the upper limit, the surface unevenness becomes so significant as to weaken the sticking strength, and it may possibly cause a problem in practical use.

The addition amount of the lubricant, as an addition amount to the polymer solid matter in the polyamide acid solution, is 0.05 to 50 mass %, preferably 0.1 to 3 mass %, and more preferably 0.20 to 1.0 mass %. If the addition amount of the lubricant is too small, the effect of the lubricant addition is hardly expected, slippage is scarcely secured and polyimide film production may possibly be hindered, and if it is too much, the surface unevenness of the film becomes so significant as to possibly lead problems of lowering the smoothness although the slippage is secured; lowering the breaking strength and rupture elongation of the polyimide film; increasing CTE; and the like.

In the case where the lubricants (particles) are added to/contained in the polyimide film, the polyimide film may be made to be a monolayer polyimide film in which the lubricants are evenly dispersed, and for example, the polyimide film may be made to be a multilayer polyimide film which is constituted of a polyimide film containing the lubricants in one surface and a polyimide film containing no lubricant or a small amount of the lubricants in the other surface. In such a multilayer polyimide film, fine unevenness is imparted to one layer (film) surface so that the slippage of the layer (film) can be secured, and thus a good handling property and productivity can be attained. Hereinafter, production of the multilayer polyimide film will be described.

The multilayer polyimide film is preferably produced by, for example, using two polyamide acid solutions; one solution containing lubricants (preferably having an average particle diameter of about 0.05 to 2.5 μm) in an amount of 0.05 mass % to 50 mass % (preferably 0.1 to 3 mass %, and more preferably 0.20 to 1.0 mass %) based on the polymer solid matter in the polyamide acid solution, and the other solution containing no lubricant or a small amount of lubricants (preferably 0.3 mass % or less, and more preferably 0.01 mass % or less based on the polymer solid matter in the polyamide acid solution) as a polyamide acid solution (polyimide precursor solution).

A multilayer formation (lamination) method for the multilayer polyimide film is not particularly limited if there occurs no problem on adhesion of both layers, and both layers are closely stuck to each other without an adhesive layer or the like interposed therebetween. Examples thereof include i) a method for fabricating one polyimide film and thereafter continuously applying a polyamide acid solution onto the former polyimide film to carry out imidization; ii) a method for producing a polyamide acid film by casting one polyamide acid solution and thereafter continuously applying a polyamide acid solution onto the former polyamide acid film to carry out imidization; iii) a method by co-extrusion; iv) a method for applying a polyamide acid solution containing a large amount of lubricants onto a film formed from a polyamide acid solution containing no lubricant or a small amount of lubricants by spray coating, T-die coating, or the like to carry out imidization; and the like. The above-mentioned i) and ii) methods are preferable.

The ratio of the thickness of the respective layers in the multilayer polyimide film is not particularly limited, but it is preferable that (a) layer/(b) layer is 0.05 to 0.95 in the case where the (a) layer is defined as a film (layer) formed from a polyamide acid solution containing a large amount of lubricants and the (b) layer is defined as a film (layer) formed from a polyamide acid solution containing no lubricant or a small amount of lubricants. If the (a) layer/(b) layer exceeds 0.95, the (b) layer tends to lose the smoothness, and on the other hand, if it is less than 0.05, the effect of improving the surface properties tends to be insufficient and the easily slipping property may possibly be lost.

It is important that at least one surface of the polyimide film facing to the substrate is subjected to plasma treatment. Execution of plasma treatment modifies the polyimide film surface to a state where functional groups exist (so-called activated state) and makes it possible attain good adhesion to the substrate.

The plasma treatment is not particularly limited, and includes RF plasma treatment in vacuum, microwave plasma treatment, microwave ECR plasma treatment, atmospheric-pressure plasma treatment, corona treatment, etc., and also includes fluorine-containing gas treatment, ion implantation treatment using an ion source, treatment by a PBII method, flame treatment, itro treatment, etc. Above all, RF plasma treatment in vacuum, microwave plasma treatment, and atmospheric-pressure plasma treatment are preferable.

Desirable as proper conditions for the plasma treatment may be treatment by plasma known as having a high chemical etching effect such as oxygen plasma, plasma containing fluorine such as $CF_4$, $C_2F_6$, or the like; or by plasma such as Ar plasma having a high physical etching effect through imparting physical energy to the polyimide surface. Further, plasma of $CO_2$, $H_2$, $N_2$, etc., is preferable and addition of their gas mixture and steam is also preferable. In the case of aiming short time treatment, plasma with a high energy density, plasma with high kinetic energy of ions in the plasma, and plasma with high number density of activated species are preferable. From this viewpoint, microwave plasma treatment, microwave ECR plasma treatment, plasma irradiation using an ion source with which high energy ions are easily implanted, a PBII method and the like are also desirable.

Effects of the plasma treatment include, besides addition of surface functional groups as described above, and change of the contact angle, improvement of the adhesion, removal of surface stains, etc., attributed to that, and a surface etching effect, so-called desmear, such as removal of irregularly-shaped substances generated by processing. Particularly, susceptibility to etching is quite different between a polymer and ceramics, and therefore only a polymer with bonding energy lower than that of ceramics is selectively etched. For this reason, under conditions of a gas species or electric discharge having an etching action, only a polymer is etched selectively to expose lubricants (particles, also referred to as filler).

The means for obtaining the etching action for the film surface besides the plasma treatment includes polishing with a pad, which includes the case of using a chemical liquid; brush polishing; polishing with sponge impregnated with a chemical liquid; polishing with a material obtained by adding abrasive particles to a polishing pad; sand blast; wet blast; and the like, and the means may be used together with the plasma treatment.

The plasma treatment may be carried out only for one surface of the polyimide film or for both surfaces thereof. In the case where plasma treatment is carried out only for one surface, the polyimide film is placed, while being brought into contact with one electrode in parallel plate electrode plasma treatment, so that the plasma treatment can be carried out only for the surface of the polyimide film which is not brought into contact with the electrode. Plasma treatment for both surfaces can be carried out by placing the polyimide film while electrically floating the polyimide film in the space between two electrodes. Further, plasma treatment is carried out in the state where a protection film is stuck to one surface of the polyimide film so that one surface treatment is made possible. A PET film or an olefin film bearing a pressure-sensitive adhesive may be used as the protection film.

The polyimide film subjected to the plasma treatment is preferable to be subjected to acid treatment after the plasma treatment. In the polyimide film surface containing the lubricants (particles), even if the lubricants form projected shapes near the surface, there exists a very thin polyimide layer in the surface. A polyimide is strongly resistant to an acid, and therefore if the polyimide layer exists in the lubricant surface even though it is an extremely thin layer, the acid is not directly brought into contact with the lubricant surface and the lubricant surface is not eroded when acid treatment is carried out; however, the acid is directly brought into contact with the lubricant surface after the polymer (polyimide) alone is etched selectively because of the etching effect of the plasma treatment, and therefore only the lubricants can be dissolved and removed within a very short time by selecting a proper kind of acid and carrying out acid treatment so that craters are formed.

Figure 6:
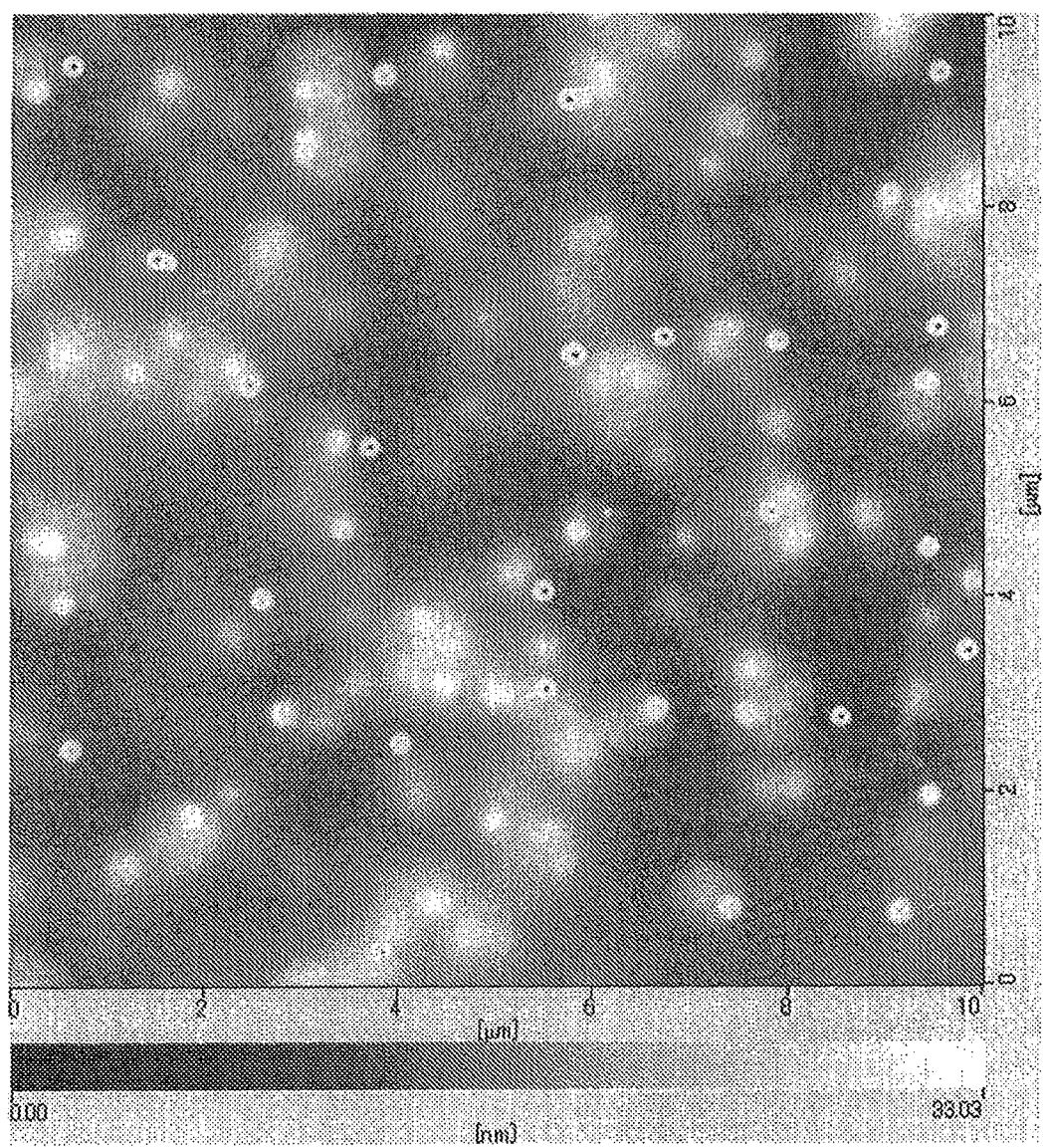
FIG. 6 is an AFM image (10 μm square) including the crater part.

The craters are supposed to be residues left by elution of the lubricants exposed to the polyimide film surface by the plasma treatment with an acid, and are not simple dents but recesses with rising rim parts. For reference, FIG. 4 shows an AFM image showing crater parts; FIG. 5 shows a cross-sectional image along the straight line part of the crater parts shown in FIG. 4; and FIG. 6 shows an AFM image (10 μm square) including the crater parts. The rim parts of the craters are soft as compared with the projections containing the lubricant particles therein, and are deformed with a relatively weak power at the time of pressurized adhesion between the polyimide film and the substrate. The projections containing the lubricant therein are hardly deformed and inhibit adhesion between the polyimide film and the substrate, but formation of the lubricant parts to the crater-like shape heightens the adhesion between the polyimide film and the substrate, and further makes it possible to increase delamination strength between the polyimide film and the substrate.

The acid treatment may be carried out by immersing the polyimide film subjected to the plasma treatment in a chemical liquid containing an acid, or by applying or spraying the chemical liquid to the polyimide film subjected to the plasma treatment, and in this case, ultrasonic washing may be employed in combination. It is also possible to carry out acid treatment only for one surface by carrying out the acid treatment in the state where one surface of the polyimide film is stuck with a protection film. A PET film or an olefin film bearing a pressure-sensitive adhesive may be used as the protection film.

The acid to be used for the acid treatment may be any acid if it can etch only the lubricants, and examples thereof include HF, BHF, etc., and these acids are usually used in the form of an aqueous solution. It is because an aqueous HF solution and an aqueous BHF solution are generally known to have an action of dissolving $SiO_2$ or glass, and are often used in semiconductor industries. For example, the efficiency of HF for dissolving $SiO_2$ has been investigated well, and it is known that the etching ratio of $SiO_2$ with a 10 mass % aqueous HF solution is about 12 angstroms/second at normal temperature, and thus a $SiO_2$ lubricant with about 80 nm can sufficiently be treated by contact with a chemical liquid for about 1 minute. According to such findings and use experiments, in the case where the acid treatment is carried out by an aqueous HF solution or an aqueous BHF solution, the lubricant is preferably $SiO_2$; however, the kinds of the lubricant are not, of course, limited to $SiO_2$.

The acid concentration in the chemical liquid is preferably 20 mass % or lower, and more preferably 3 to 10 mass %. If the acid concentration in the chemical liquid is too thin, the etching time takes so long as to lower the productivity, and if it is too thick, the etching time is so quick as to expose the lubricant to the chemical liquid beyond necessity.

The step of carrying out plasma treatment and acid treatment for a polyimide film (an original material) is preferably carried out by roll-to-roll in terms of improvement in treatment efficiency. The polyimide film roll subjected to the plasma treatment also contains the lubricant, and therefore a handling property in the form of a roll is the same as that before plasma treatment. It is also advantageous in term of achievement of simple step that the polyimide film is subjected to the plasma treatment in the form of a roll and then cut into sheets to carry out the acid treatment.

The surface state of the polyimide film subjected to the plasma treatment and the acid treatment as described above is preferable that one surface has 2 to 100 craters with a diameter of 10 to 500 nm per 100 $\mu m^2$ and the other surface has an Ra of 0.3 nm to 0.95 nm when the polyimide film is observed by an AFM method described later, and attributed to that, the polyimide film may have improved adhesion and a surface provided with smoothness more suitable for conjugation to/lamination on the substrate without an adhesive.

The polyimide film having 2 to 100 craters with a diameter of 10 to 500 nm per 100 $\mu m^2$ in one surface may have more proper delamination strength in conjugation lamination on the substrate without an adhesive. The number of the craters is preferably 5 to 30 per 100 $\mu m^2$, and the diameter of the crater is preferably 30 to 100 nm. In the case where the diameter of the crater is shorter than 10 nm, the adhesion improvement effect is lowered, and in the case where if it exceeds 500 nm, excess etching is required and it causes an adverse effect on the polyimide film strength and hardly exhibits an effect on adhesion improvement. In the case where the number of the craters is less than 2, the adhesion improvement effect is lowered, and in the case where if it exceeds 100, it causes an adverse effect on the polyimide film strength and hardly exhibits an effect on adhesion improvement.

The fact that the other surface of the polyimide film is a smooth surface with an Ra of 0.3 nm to 0.95 nm is particularly preferable in fabrication of a finely precise electric circuit and semiconductor device, and for example, in the case where Ra exceeds 2.0 nm, the surface fails to have needed smoothness and may cause an adverse effect on a metal foil film, etc., formed thereon in terms of adhesion and smoothness. The polyimide film having such a smooth surface can be produced by using a solution to which a lubricant is added and a solution to which no lubricant or an extremely small amount of the lubricant is added in combination as a polyamide acid solution (polyimide precursor solution) for polyimide formation, and it is made easy to produce a polyimide film provided with a roll winding property and proper slippage at the time of polyimide film fabrication.

<Coupling Agent Treatment>

In the method for producing a laminate of the present invention, at least one of surfaces of the substrate and the polyimide film facing to each other is subjected to a coupling agent treatment to form a coupling treatment layer. In the present invention, the coupling agent means a compound having an action of increasing the adhesive force between the substrate and the polyimide film with the coupling agent physically or chemically interposed therebetween, and generally includes compounds known as a silane-based coupling agent, a phosphorus-based coupling agent, a titanate-based coupling agent, and the like.

The coupling agent is not particularly limited, and particularly, a silane coupling agent having an amino group or an epoxy group is preferable. Preferable concrete examples of the silane coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, tris-(3-trimethoxysilylpropyl) isocyanurate, chloromethylphenethyltrimethoxysilane, chloromethyltrimethoxysilane, and the like.

Besides those described above, examples of the coupling agent to be used in the present invention may also include 1-mercapto-2-propanol, methyl 3-mercaptopropionate, 3-mercapto-2-butanol, butyl 3-mercaptopropionate, 3-(dimethoxymethylsilyl)-1-propanethiol, 4-(6-mercaptohexanoyl)benzyl alcohol, 11-amino-1-undecenethiol, 11-mercaptoundecylphosphonic acid, 11-mercaptoundecyltrifluoroacetic acid, 2,2'-(ethylenedioxy)diethanethiol, 11-mercaptoundecyltri(ethylene glycol), (1-mercaptoundec-11-yl)tetra(ethylene glycol), 1-(methylcarboxy)undec-11-yl) hexa(ethylene glycol), hydroxyundecyl disulfide, carboxyundecyl disulfide, hydroxyhexadodecyl disulfide, carboxyhexadecyl disulfide, tetrakis(2-ethylhexyloxy)titanium, titaniumdioctyloxy bis(octylene glycolate), zirconium tributoxymonoacetylacetonate, zirconium monobutoxyacetylacetonate bis(ethyl acetoacetate), zirconium tributoxymonostearate, acetoalkoxyaluminum diisopropylate, and the like.

Examples of the particularly preferable coupling agent include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, aminophenyltrimethoxysilane, aminophenethyltrimethoxysilane, aminophenyl aminomethyl phenethyltrimethoxysilane, and the like. In the case where particularly high heat resistance is required in process, those having Si and an amino group boned with an aromatic group are preferable.

Methods to be employed as a method for forming a coupling treatment layer by carrying out coupling agent treatment may be a method including applying a coupling agent directly or after dilution with a solvent or the like to a substrate and/or a polyimide film, drying the coupling agent, followed by heat treatment; a method including immersing a substrate and/or a polyimide film in a coupling agent itself or in a solution obtained by diluting the coupling agent with a solvent or the like, drying the coupling agent, followed by heat treatment; a method including adding a coupling agent at the time of fabricating a polyimide film and carrying out coupling agent treatment simultaneously with the polyimide film fabrication; and the like. The application amount (deposition amount or content) of the coupling agent may be set properly so that the coupling treatment layer to be formed has a thickness described below. The conditions at the time of heat treatment may be heating at a temperature of preferably 50 to 250° C., more preferably 75 to 165° C., and furthermore preferably about 95 to 155° C., and preferably for 30 seconds or longer, more preferably 2 minutes or longer, and furthermore preferably 5 minutes or longer. If the heating temperature is too high, the coupling agent may possibly be decomposed or inactivated, and if it is too low, fixation may possibly become insufficient. If the heating time is too long, similar problems may possibly be also caused, and the upper limit of the heating time is preferably 5 hours, and more preferably about 2 hours. At the time of carrying out the coupling agent treatment, it is known that pH during the treatment significantly affects the performance, and therefore it is desirable to properly adjust pH.

<Pattern Formation>

In the method for producing a laminate of the present invention, a prescribed pattern is formed successively to the coupling agent treatment by carrying out inactivation treatment for a part of the coupling treatment layer by etching. This makes it possible to form parts strong in delamination strength and parts weak in delamination strength intentionally between the substrate and the polyimide film. The inactivation treatment for the coupling treatment layer includes physically removing partial coupling treatment layer (so-called etching); physically masking in micro-scale for the coupling treatment layer; and chemically denaturing the coupling treatment layer.

As means for forming a prescribed pattern by carrying out inactivation treatment selectively for parts of the coupling treatment layer, parts of the coupling treatment layer corresponding to the prescribed pattern is temporarily coated or shielded with a mask, thereafter etching or the like is carried out on the entire surface, and then the mask is removed; or etching or the like may be carried out depending on the prescribed pattern by directly drawing manner, if possible. As the mask, those used generally as resist, a photomask, a metal mask, etc., may be properly selected and used depending on an etching method.

The pattern shape is not particularly limited, and may be set properly depending on the kinds of devices to be laminated. One example is as shown in FIG. 3, and includes, as shown in FIG. 3(1), a pattern in which a good adhesion part 10 is arranged only in the outer circumferential part of the laminate and an easily peeling part 20 is arranged in the inside of the laminate, or as shown in FIG. 3(2), a pattern in which a good adhesion part 10 is arranged linearly in both outer circumferential part and inside of the laminate.

The inactivation treatment may be preferably at least one treatment selected from the group consisting of blast treatment, vacuum plasma treatment, atmospheric-pressure plasma treatment, corona treatment, active radiation irradiation treatment, active gas treatment, and chemical liquid treatment.

The blast treatment refers to treatment of blowing particles with an average particle diameter of 0.1 to 1000 μm together with a gas or a liquid to an object. In the present invention, blast treatment using particles with an average particle diameter as small as possible is preferably carried out.

The vacuum plasma treatment refers to treatment of exposing an object to plasma generated by electric discharge in a reduced pressure gas, or of allowing ions generated by the same electric discharge to collide with the object. Examples of the gas that can be used include neon, argon, nitrogen, oxygen, fluorocarbon, carbon dioxide, hydrogen and the like singly as well as a mixture gas.

The atmospheric-pressure plasma treatment refers to treatment of exposing an object to plasma generated by electric discharge in gas under approximately atmospheric pressure, or of allowing ions generated by the same electric discharge to collide with the object. Examples of the gas that can be used include neon, argon, nitrogen, oxygen, fluorocarbon, carbon dioxide, hydrogen and the like singly as well as a mixture gas.

The corona treatment refers to treatment of exposing an object to corona discharge atmosphere in gas under approximately atmospheric pressure, or of allowing ions generated by the same electric discharge to collide with the object.

The active radiation irradiation treatment refers to treatment of irradiating radiations such as electron beams, alpha rays, x-rays, beta rays, infrared rays, visible light, ultraviolet rays, laser beams, and the like. In the case of carrying out laser beam irradiation treatment, particularly, it is easy to carry out the treatment in a direct drawing manner. In this case, even in the case of visible light laser, because of rather higher energy than common visible light, a visible light laser can be regarded as one of active radiations in the present invention.

The active gas treatment refers to treatment of exposing an object to a gas so active as to cause chemical or physical changes of the coupling treatment layer, such as a halogen gas, a hydrogen halide gas, ozone, high concentration oxygen gas, ammonia gas, an organic alkaline gas and an organic acidic gas.

The chemical liquid treatment refers to treatment of exposing an object to a liquid or solution so active as to cause chemical or physical changes of the coupling treatment layer, such as an alkaline solution, an acidic solution, a reducing agent solution, and an oxidizing agent solution.

Particularly, from the viewpoint of the productivity, methods preferably employed as the inactivation treatment are a method using active radiation and a mask in combination and a method using atmospheric-pressure plasma treatment and a mask in combination. From the viewpoint of economy and safety, ultraviolet irradiation treatment, that is, UV irradiation treatment is preferable as the active radiation treatment. In the case of UV irradiation treatment, a material having UV permeability is selected as the substrate and the coupling agent treatment is carried out for the substrate, UV irradiation may be then carried out by direct drawing or through a mask from the surface opposite to the surface subjected to the treatment. Accordingly, in the present invention, the inactivation treatment is carried out preferably by UV irradiation, and hereinafter, the description will be given in detail.

The UV irradiation treatment in the present invention is treatment by putting a polyimide film and/or a substrate subjected to the coupling agent treatment in an apparatus generating ultraviolet rays (UV light) with a wavelength of 400 nm or shorter, and carrying out UV irradiation, and the wavelength of UV light is short wavelength of preferably 260 nm or shorter, and more preferably 200 nm or shorter. If irradiation of UV light with such short wavelength is performed in environments where oxygen exists, UV light energy is applied to a sample (coupling treatment layer) and at the same time, active oxygen and ozone in an excited state are generated in the periphery of the sample so that the inactivation treatment of the present invention can be effectively carried out. However, UV light absorption by oxygen is significant if the UV light has a wavelength of 170 nm or shorter, and therefore there is a need to consider carefully for making the UV light reach the coupling treatment layer. In the case of irradiation in completely oxygen-free environments, no effect for surface modification (inactivation) by active oxygen and ozone is exhibited, and therefore it is necessary to allow UV light to pass through and also active oxygen and ozone to reach there. For example, in addition to a countermeasure for the apparatus such that a UV light source is placed in a nitrogen atmosphere and irradiation of UV light after transmitting UV light through quartz glass is performed to shorten the distance from the quartz glass to the coupling treatment layer, thereby suppressing the UV light absorption; and a method for controlling absorption of UV light by oxygen as a method for controlling oxygen amount without employing common atmosphere for the environments, and a method for controlling a UV light source and gas current in the coupling treatment interlayer are also effective as methods for controlling the UV light permeation and ozone generation amount.

The UV light irradiation intensity is desirably 5 mW/cm$^2$ or higher and 200 mW/cm$^2$ or lower when measured by a UV actinometer having a sensitivity peak at least in a range of 150 nm to 400 nm in order to prevent the substrate from denaturing. The UV light irradiation time is preferably 0.1 minutes or longer and 30 minutes or shorter, more preferably 0.5 minutes or longer, furthermore preferably 1 minute or longer, and particularly preferably 2 minutes or longer; and more preferably 10 minutes or shorter, furthermore preferably 5 minutes or shorter, and particularly preferably 4 minutes or shorter. In the case of conversion into integrated light intensity, it is preferably 30 mJ/cm$^2$ to 360000 mJ/cm$^2$, more preferably 300 mJ/cm$^2$ to 120000 mJ/cm$^2$, and furthermore preferably 600 mJ/cm$^2$ to 60000 mJ/cm$^2$.

Pattern formation at the time of UV irradiation treatment can be carried out by intentionally forming parts where light irradiation is performed and parts where light irradiation is not performed. A method for forming a pattern includes a method in which parts where UV light is shielded and parts where UV light is not shielded are formed, a method of scanning UV light, or the like. In order to make the rim part of the pattern clear, it is effective to shield UV light and to cover the substrate with a mask. It is also effective to carry out scanning with parallel light of UV laser.

A light source to be used for the UV irradiation treatment is not particularly limited, and examples thereof include an excimer lamp, a low pressure mercury lamp, a high pressure mercury lamp, a Xe excimer laser, an ArF excimer laser, a KrF excimer laser, a Xe lamp, a XeCl excimer laser, a XeF excimer laser, an Ar laser, a D2 lamp, and the like. Among them, an excimer lamp, a low pressure mercury lamp, a Xe excimer laser, an ArF excimer laser, a KrF excimer laser, and the like are preferable.

As described above, a pattern having good adhesion parts, which are parts with strong delamination strength between the substrate and the polyimide film, and easily peeling parts, which are parts with weak delamination strength between the substrate and the polyimide film, is formed depending on execution of inactivation (etching) in the coupling treatment layer subjected to the inactivation treatment. For example, as shown in Examples 1 to 4 and Examples 6 to 15 described below, in the case where γ-aminopropyltrimethoxysilane is applied to glass, UV non-irradiation parts become good adhesion parts with strong delamination strength, and UV irradiation parts become easily peeling parts since the delamination strength is weakened by breaking amino groups with UV irradiation. As shown in Measurement Examples 1 to 5 described below, the above description can be assumed from the fact that atomic percent of nitrogen (N) element is lowered by UV irradiation and successively that of carbon (C) is also decreased, and therefore breakage of amino group and propyl is suggested. On the other hand, in the case where a coupling treatment layer is formed on the substrate by using a coupling agent having no functional group, e.g., n-propyltrimethoxysilane, the parts not irradiated with UV contrarily become easily peeling parts and good adhesion parts are formed by breaking propyl parts by UV light irradiation. As the substrate, use of glass as a basal plate is industrially advantageous, and in this case, it is more practical to lower the delamination strength by UV irradiation; however, it is supposedly possible to make the UV light irradiation parts be the good adhesion parts in accordance with the use, basal plate to be used, and delamination strength to be required.

<Pressurizing and Heating Treatment>

In the method for producing a laminate of the present invention, after the etching, the substrate and the polyimide film are overlapped with each other and subjected to pressurizing and heating treatment. Accordingly, the substrate and the polyimide film can be stuck to each other.

In general, a method for forming a film by directly applying a polyimide varnish (the above-mentioned polyamide acid solution) onto a substrate and carrying out imidization is supposedly possible as a method for obtaining a laminate of a substrate and a polyimide film, but in the present invention, after film formation of a polyimide, the polyimide film is laminated on the substrate. It is because if imidization is carried out by heating the polyamide acid solution on the substrate, concentric thickness distribution tends to be formed easily although it depends on the substrate, or a film warped or having blisters from the substrate tends to be formed since the front and rear states of the polyimide film (heat transmission or the like) are different, but contrarily, if film formation is carried out beforehand, these problems can be voided. Further, overlap of the film on the substrate makes it possible to form devices (circuit and the like) before the overlap in a range where the pressurizing and heating treatment described below can be carried out.

A method for pressurizing and heating treatment may be carried out by, for example, press, lamination, and roll lamination while applying heat. A method for pressurized heating can be also employed in the state where the object is in a flexible bag. Particularly, a method using a roll (roll lamination or the like) is preferable.

The pressure at the time of the pressurizing and heating treatment is preferably 1 MPa to 20 MPa, and more preferably 3 MPa to 10 MPa. If the pressure is too high, the substrate may possibly be damaged, and if the pressure is too low, parts which do not adhere may be formed and the adhesion may possibly be insufficient. The temperature at the time of pressurizing and heating treatment is preferably 150° C. to 400° C., and more preferably 250° C. to 350° C. If the temperature is too high, the polyimide film may possibly be damaged, and if the temperature is too low, the adhesion tends to be weak.

The pressurizing and heating treatment may be carried out in atmospheric air, but in order to obtain stable delamination strength in the entire surface, it is preferable to be carried out under vacuum. The vacuum degree in this case is sufficient to be the vacuum degree by a common oil-sealed rotary pump, and it is sufficiently about 10 Torr or lower.

As for apparatuses that can be used for the pressurizing and heating treatment, "11FD" manufactured by Imoto Machinery Co., Ltd., or the like may be used in the case of pressing in vacuum, and "MVLP" manufactured by Meiki Co., Ltd. such as a roll type film laminator in vacuum or a film laminator for applying pressure at once to the entire glass surface by a thin rubber film after generation of vacuum may be used in the case of vacuum lamination.

The pressurizing and heating treatment can be carried out separately by pressurizing process and heating process. In this case, first, the polyimide film and the substrate are pressurized (preferably at about 0.2 to 50 MPa) at relatively low temperature (e.g., lower than 120° C., and more preferably 95° C. or lower) to securely allow to adhere, and thereafter, the polyimide film and the substrate are heated at relatively high temperature (e.g., 120° C. or higher, more preferably 120 to 250° C., and furthermore preferably 150 to 230° C.) at low pressure (preferably lower than 0.2 MPa, and more preferably 0.1 MPa or lower) or normal pressure to accelerate chemical reaction in the adhesion interface so that the polyimide film and the substrate can be laminated.

<Application>

In the method for producing a laminate of the present invention, as an application example, a non-polyimide part may be formed, if necessary, by forming a hole part penetrating the polyimide film in the laminate or the entire laminate in the thickness direction. The part is not particularly limited and includes holes which are filled with a metal containing mainly a metal component such as Cu, Al, Ag, or Au; voids formed by a mechanical drill or laser boring; and voids on which a metal film is formed by sputtering, electroless plating, or seed layer formation; and the like.

(Laminate)

The laminate of the present invention is a laminate obtained by laminating a substrate and a polyimide film with a coupling treatment layer interposed therebetween, wherein the laminate has good adhesion parts and easily peeling parts with different delamination strength between the substrate and the polyimide film, and the good adhesion parts and the easily peeling parts form a prescribed pattern. Accordingly, the laminate does not cause peeling even in high temperature process at the time of device fabrication, and the polyimide film can be easily peeled from the substrate after a device is fabricated on the polyimide film. The laminate of the present invention can be obtained by the method for producing a laminate of the present invention, and the details of the substrate, polyimide film, coupling treatment layer, and the like are those described above.

In the present invention, the good adhesion parts refers to parts with strong delamination strength of the substrate and the polyimide film by changing the surface properties in the presence or absence of UV light irradiation. In the present invention, the easily peeling parts refers to parts with weak delamination strength of a basal plate made of an inorganic substance and the polyimide film by changing the surface properties in the presence or absence of UV light irradiation.

In the present invention, the 180-degree peel strength between the substrate and the polyimide film may be set properly in accordance with the kind and process of devices to be laminated thereon, and is not particularly limited, but the 180-degree peel strength in the easily peeling part is preferably ½ or lower and more preferably ⅕ or lower of the 180-degree peel strength of the good adhesion part. In general, the 180-degree peel strength of the good adhesion part is preferably 0.5 N/cm or higher and 5 N/cm or lower, and more preferably 0.8 N/cm or higher and 2 N/cm or lower. The 180-degree peel strength of the easily peeling part is preferably 0.01 N/cm or higher and 0.40 N/cm or lower, and more preferably 0.01 N/cm or higher and 0.2 N/cm or lower. Herein, the lower limit of the 180-degree peel strength of the easily peeling part is a value determined in consideration of the bending energy of the polyimide film. The 180-degree peel strength in the present invention can be measured by a method described in Examples below. The heat resistant delamination strength, acid resistant delamination strength, and alkali resistant delamination strength described in Examples below are also desirable to be 0.5 N/cm or higher and 5 N/cm or lower, respectively; however, the required numerals may possibly be changed depending on the process.

In the laminate of the present invention, unlike conventional laminates, no adhesive layer or the like is interposed between the substrate and the polyimide film, and there exists only an interlayer containing 10 mass % or more of Si derived from, for example, a coupling agent. The coupling treatment layer, which is an interlayer between the substrate and the polyimide film, can be made so extremely thin that it can exert effects such that generation of degassing components is small during heating, elution scarcely occurs even in wet process, and the amount to be eluted is only a small amount even if elution occurs. The coupling treatment layer generally contains a large amount of a heat resistant silicon oxide component so that heat resistance at a temperature of about 400° C. can be obtained.

The thickness of the coupling treatment layer in the laminate of the present invention is extremely thin as compared with that of the substrate, or polyimide film in the present invention, or a common adhesive or pressure sensitive adhesive, and can be negligible from the viewpoint of mechanical designing, and may be sufficient theoretically to have a thickness of at least mono-molecular layer order. It is generally thinner than 400 nm (thinner than 0.4 km), and preferably 200 nm or thinner (0.2 μm or thinner); and practically, it is preferably 100 nm or thinner (0.1 μm or thinner), more preferably 50 nm or thinner, and furthermore preferably 10 nm or thinner. In the process in which a coupling agent is desirably as low as possible, the thickness of 5 nm or thinner is also possible. However, if it is thinner than 1 nm, the delamination strength is decreased or parts which does not partially adhere may possibly be formed, and therefore the thickness is preferably 1 nm or thicker. The thickness of the coupling treatment layer can be measured by an ellipsometry method or by calculation from the concentration and application amount of the coupling agent solution at the time of application.

(Method for Producing Device Structure)

The method for producing a device structure of the present invention is a method for producing a structure having a device formed on the polyimide film as a basal plate by using the laminate of the present invention having the substrate and the polyimide film.

In the method for producing a device structure of the present invention, a device is formed on the polyimide film of the laminate of the present invention, and thereafter a notch is formed in the polyimide film at the easily peeling part of the laminate, and the polyimide film is peeled from the substrate.

Examples of a method for forming a notch in the polyimide film at the easily peeling part of the laminate include, but are not particularly limited to, a method for cutting the polyimide film by a cutter; a method for cutting the polyimide film by relatively scanning laser and the laminate; a method for cutting the polyimide film by relatively scanning water jet and the laminate; a method for cutting the polyimide film while forming a notch reaching slightly the glass layer by a dicing apparatus for a semiconductor chip; and the like.

At the time of forming a notch in the polyimide film at the easily peeling part of the laminate, the position to which the notch is formed may be sufficient if it includes at least a portion of the easily peeling part, and basically it is common to carry out cutting along with a pattern. However, an error may be caused when cutting is carried out accurately in the boundary of the good adhesion parts and the easily peeling parts along with a pattern, and therefore it is preferable to form the notch slightly closer to the easily peeling part side than the pattern in terms of an improvement in productivity. In order to prevent unintentional peeling before intentional peeling, there may also be a production manner where the notch is formed slightly closer to the good adhesion parts than the pattern. Further, if the width of the good adhesion part is set to be narrow, the polyimide film remaining in the good adhesion parts at the time of peeling can be decreased, and the utilization efficiency of the film is improved, and the device surface area to the laminate surface area is increased, resulting in improvement of the productivity. Moreover, a manner may also be employed as an extreme manner of the present invention such that an easily peeling part is formed in a portion of the outer circumferential part of the laminate, the outer circumferential part is set as a cutting position, and actually peeling is performed without forming a notch.

A method for peeling the polyimide film from the substrate is not particularly limited, but employable methods include a method of tear off the polyimide film from an end with a pair of tweezers; a method of sticking a pressure-sensitive adhesive tape to one side of the notched portion of the polyimide film bearing a device, and tear off the polyimide film from the tape part; a method of vacuum adsorbing one side of the notched portion of the polyimide film bearing a device, and tear off the polyimide film from that part; and the like. At the time of peeling, if a curve with a small curvature is formed in the notched portion of the polyimide film bearing a device, the stress may possibly be applied to the device in that part to break the device, and therefore peeling is desirably carried out in the state with a large curvature. For example, it is desirable to roll up the polyimide film while winding the polyimide film on a roll with a large curvature, or to roll up the polyimide film by a machine with a configuration of positioning a roll with a large curvature at the peeling portion.

The device structure (polyimide film bearing a device) of the present invention is allowed to fix a reinforcing member until it is made to be a final product. In this case, the reinforcing member may be fixed after the device structure is peeled from the substrate, but it is preferable that the reinforcing member is fixed and thereafter a notch is formed in the polyimide film and the polyimide film is peeled from the substrate, or that a notch is formed in the polyimide film and thereafter the reinforcing member is fixed in the notched portion and peeling is carried out. In the case where the reinforcing member is fixed before peeling, it is made possible to give a configuration of hardly applying the stress to the device portion as much as possible by taking into consideration the elastic modulus and thickness of the polyimide film and the reinforcing member.

In the case the reinforcing member is fixed before peeling, a polymer film, extremely thin glass, SUS, or the like may be used preferably as the reinforcing member. A polymer film has an advantage in that it keeps a device lightweight and is also advantageous in transparency, various processabilities, and hardly cracking properties. Extremely thin glass is advantageous in gas barrier properties, stability against chemicals, and transparency. SUS is advantageous in electric shielding and hardly cracking properties. The polymer film has been already subjected to process requiring high temperature, and therefore the polymer film is scarcely restricted in heat resistance, and various polymer films can be selected. These reinforcing members may be fixed by adhesion or pressure-sensitive adhesion.

In the present invention, a method for forming a device on the polyimide film, a basal plate, may be carried out properly according to a conventionally known method.

The device in the present invention is not particularly limited, and includes only wiring for electronic circuits and an electric resistance, as well as passive devices such as a coil and a capacitor, active devices including a semiconductor device and the like, and an electronic circuit system obtained by combining these devices. Examples of the semiconductor device include a solar cell, a thin film transistor, a MEMS device, a sensor, a logic circuit, and the like.

For example, a film-like solar cell using the laminate of the present invention is obtained by using the polyimide film of the laminate of the present invention as a basal plate and forming a laminate X containing a photoelectric conversion layer made of a semiconductor on the basal plate. The laminate X has a photoelectric conversion layer for converting sunlight energy into electric energy as an indispensable constituent, and usually further has an electrode layer and the like for taking the obtained electric energy out.

Hereinafter, as a typical example of the laminate X so formed as to constitute a film-like solar cell, a lamination structure having a photoelectric conversion layer sandwiched between a pair of electrode layers will be described. A configuration formed by overlapping some photoelectric conversion layers can be referred to as a solar cell in the present invention if it is fabricated by PVD or CVD. Naturally, the lamination structure of the laminate X is not limited to the aspects described below, and the configuration of a laminate contained in a solar cell of a conventional technique may properly be referred to, and a protection layer and conventionally known auxiliary means may be added.

One electrode layer in the pair of electrode layers (hereinafter, also described as a back electrode layer) is preferably formed on one main surface of the polyimide film basal plate. The back electrode layer is obtained by laminating a conductive inorganic material through a conventionally known method, e.g., a CVD (chemical vapor deposition) method or a sputtering method. Examples of the conductive inorganic material include metal thin films of Al, Au, Ag, Cu, Ni, stainless steel, etc., and oxide semiconductor type conductive materials such as $In_2O_3$, $SnO_2$, ZnO, $Cd_2SnO_4$, and ITO ($In_2O_3$ doped with Sn). The back electrode layer is preferably a metal thin film. The thickness of the back electrode layer is not particularly limited, and is usually about 30 to 1000 nm. Further, a film formation method using an Ag paste without requiring vacuum may be employed for leading a portion of an electrode.

The photoelectric conversion layer for converting sunlight energy into electric energy is a layer made of a semiconductor, the layer being made of a compound semiconductor thin film containing Group I elements, Group III elements, and Group VI elements (chalcopyrite structure semiconductor thin film) such as a $CuInSe_2$ (CIS) film or a $Cu(In,Ga)Se_2$ (CIGS) film obtained by forming its solid solution with Ga (hereinafter, both are collectively referred to as CIS-based film); or a silicon-based semiconductor. The silicon-based semiconductor includes a thin film silicon layer, an amorphous silicon layer, a polycrystalline silicon layer, and the like. The photoelectric conversion layer may be a laminate having a plurality of layers made of different semiconductors. Alternatively, the photoelectric conversion layer may be a photoelectric conversion layer using a pigment. Further, the photoelectric conversion layer may be a layer using an organic thin film semiconductor containing an organic compound such as conductive polymers or fullerene.

The thin film silicon layer is a silicon layer obtained by a plasma CVD method, a thermal CVD method, a sputtering method, a cluster ion beam method, an evaporation method, or the like.

The amorphous silicon layer is a layer made of silicon substantially having no crystallinity. The fact that the amorphous silicon layer substantially has no crystallinity can be confirmed by no diffraction peak in x-ray irradiation. A method for obtaining the amorphous silicon layer is known, and such a method includes a plasma CVD method, a thermal CVD method, and the like.

The polycrystalline silicon layer is a layer made of aggregates of micro-crystalline silicon. The polycrystalline silicon layer is distinguished from the amorphous silicon layer by giving a diffraction peak in x-ray irradiation. A method for obtaining the polycrystalline silicon layer is known, and such a method includes a method for heat treatment of amorphous silicon.

The photoelectric conversion layer is not limited to a silicon-based semiconductor layer, and may be a thick semiconductor layer. The thick semiconductor layer is a semiconductor layer formed by using a paste of titanium oxide, zinc oxide, copper iodide, or the like.

As means for constituting the photoelectric conversion layer by using a semiconductor material, conventionally known methods may properly be employed. For example, about 20 nm a-Si (n-layer) is formed by carrying out high frequency plasma discharge at a temperature of 200 to 500° C. in a gas obtained by adding phosphine ($PH_3$) to $SiH_4$, successively about 500 nm a-Si (i-layer) is formed in $SiH_4$ gas alone, and continuously about 10 nm p-Si (p-layer) is formed in a gas obtained by adding diborane ($B_2H_6$) to $SiH_4$.

Among the pair of electrode layers sandwiching the photoelectric conversion layer, the electrode layer (hereinafter, also referred to as a current collecting electrode layer) to be formed on the opposite side to the polyimide film basal plate may be an electrode layer formed by hardening a conductive paste containing conductive filler and a binder resin, or a transparent electrode layer. As the transparent electrode layer, oxide semiconductor-based materials such as $In_2O_3$, $SnO_2$, ZnO, $Cd_2SnO_4$, ITO ($In_2O_3$ doped with Sn) are preferably usable.

Consequently, a preferable aspect of the present invention, that is, a film-like solar cell is obtained by laminating layers of transparent electrode/p type a-Si/i type a-Si/n type a-Si/metal electrode/polyimide film in this order. The structure may be changed by using a-Si for the p-layer, polycrystalline silicon for the n-layer, and inserting a thin undoped a-Si layer between the layers. Particularly, if the structure is made to be an a-Si/polycrystalline silicon-based hybrid structure, the sensitivity to the sunlight spectrum can be improved. In fabrication of the solar cell, in addition to the structure, a reflection prevention layer, a surface protection layer and the like may be added.

The thin film transistor (TFT) refers to one fabricated by depositing thin films to form a semiconductor layer constituting a transistor and an insulating film, an electrode, a protection insulating film, etc., constituting devices. Usually, the thin film transistor is distinguished from those using silicon of a silicon wafer as a semiconductor layer. Usually, the thin film transistor is fabricated by a technique utilizing vacuum, for example, PVD (physical vapor deposition) such as vacuum vapor deposition, and CVD (chemical vapor deposition) such as plasma CVD. Therefore, the thin film transistor includes those which are not single crystal unlike a silicon wafer. Although using Si, the thin film transistor includes a microcrystalline silicon TFT, a high temperature polysilicon TFT, a low temperature polysilicon TFT, an oxide semiconductor TFT, an organic semiconductor TFT, and the like.

The MEMS device means a product fabricated by utilizing MEMS technique, and includes an inkjet printer head, a probe for a scanning type probe microscope, a contactor for an LSI prober, a spatial light modulator for mask-less exposure, an integrated optical device, an infrared sensor, a flow rate sensor, an acceleration sensor, a MEMS gyro sensor, an RF MEMS switch, an in vivo/in vitro blood pressure sensor, and a video projector using a grating light bulb, a digital micromirror device, or the like.

The sensor includes a strain gauge, a load cell, a semiconductor pressure sensor, an optical sensor, a photoelectronic device, a photodiode, a magnetic sensor, a contact temperature sensor, a thermistor temperature sensor, a resistance thermometer sensor, a thermocouple temperature sensor, a contactless temperature sensor, a radiation thermometer, a microphone, an ion concentration sensor, a gas concentration sensor, a displacement sensor, a potentiometer, a differential trans-displacement sensor, a rotation angle sensor, a linear encoder, a tachogenerator, a rotary encoder, a position sensitive detector (PSD), an ultrasonic range finder, an electrostatic capacitance displacement meter, a laser Doppler vibration velocimeter, a laser Doppler current meter, a gyro sensor, an acceleration sensor, an earthquake sensor, a one-dimensional/linear image sensor, a two-dimensional/CCD image sensor, a CMOS image sensor, a liquid/liquid leakage sensor (leak sensor), a liquid detection sensor (level sensor), a hardness sensor, an electric field sensor, an electric current sensor, a voltage sensor, an electric power sensor, an infrared sensor, a radiation sensor, a humidity sensor, an odor sensor, a flow sensor, an inclination sensor, a vibration sensor, a time sensor, a composite sensor obtained by combining these sensors, a sensor for outputting physical quantities or sensitivity values from the values detected by these sensors based on a certain calculation formula, and the like.

The logic circuit includes an NAND, a logic circuit based on OR, and those synchronized by clock.

Regarding the method for producing a laminate of the present invention and the method for producing a device structure of the present invention described in detail, respective embodiments will be described with reference to drawings shown in FIG. 1 and FIG. 2.

FIG. 1 is a schematic view showing one embodiment of the method for producing a laminate of the present invention, wherein (1) shows a glass basal plate 1; (2) shows the step of forming a coupling treatment layer 2 by applying a coupling agent onto the glass basal plate 1, followed by drying; (3) shows the step of arranging a UV light shielding mask 3 and then irradiating UV light; and (4) shows the step of removing the UV light shielding mask 3 after UV light irradiation. Herein, the UV exposure part in the coupling treatment layer 2 becomes a UV irradiation part 5, and the remaining part becomes a UV non-irradiation part 4. Further, (5) shows the step of sticking a polyimide film 6, and (6) shows the step of forming a notch in a polyimide film 7 on the UV irradiation part and peeling the polyimide film 7 from the glass basal plate 1.

FIG. 2 is a schematic view showing one embodiment of the method for producing a device structure of the present invention, wherein (1) shows a glass basal plate 1; (2) shows the step of forming a coupling treatment layer 2 by applying a coupling agent onto the glass basal plate 1, followed by drying; (3) shows the step of arranging a UV light shielding mask 3 and then irradiating UV light; and (4) shows the step of removing the UV light shielding mask 3 after UV light irradiation. Herein, the UV exposure part in the coupling treatment layer 2 becomes a UV irradiation part 5, and the remaining part becomes a UV non-irradiation part 4. Further, (5) shows the step of sticking a polyimide film 6 and thereafter a device 8 is fabricated on the surface of a polyimide film 7 on the UV irradiation part, and (6) shows the step of forming a notch in the polyimide film 7 on the UV irradiation part and peeling the polyimide film 7 from the glass basal plate 1.

This application claims the benefits of priority to Japanese Patent Application No. 2011-091040 filed on Apr. 15, 2011 and priority to Japanese Patent Application No. 2011-239766 filed on Oct. 31, 2011. The entire content of the specification of Japanese Patent Application No. 2011-091040 filed on Apr. 15, 2011 and that of the specification of Japanese Patent Application No. 2011-239766 filed on Oct. 31, 2011 are incorporated herein by reference.

EXAMPLES

Hereinafter, the present invention will be described concretely by way of Examples and Comparative Examples; however, the present invention is not limited to Examples below. The evaluation methods for physical properties in Examples below are as follows.

<Thickness of Polyimide Film or the Like>

The thicknesses of a polyimide film and respective layers (a-layer, b-layer) constituting the polyimide film were measured by using a micrometer ("Millitron 1245D", manufactured by Feinpruf).

<Tensile Elasticity, Tensile Strength, and Tensile Elongation at Break of Polyimide Film>

Strip-like specimens with a size of 100 mm×10 mm in the machine direction (MD direction) and in the transverse direction (TD direction) were cut out from each polyimide film to be measured, and ensile elasticity, tensile strength, and tensile elongation at break of each specimen were measured in the MD direction and in the TD direction, respectively, under conditions of a tension speed of 50 mm/minute and an inter-chuck distance of 40 mm by using a tension testing machine ("Autograph (R); model AG-5000 A", manufactured by SHIMADZU CORPORATION).

<Coefficient of Thermal Expansion (CTE) of Polyimide Film>

The degree of shrinkage was measured for each polyimide film to be measured under the following conditions in the machine direction (MD direction) and in the transverse direction (TD direction), the ratio of degree of shrinkage/temperature was measured at every 15° C. interval (30° C. to 45° C., 45° C. to 60° C., and the like) up to 300° C., and then the average value of all measured values was calculated as a coefficient of thermal expansion (CTE).

Apparatus name: "TMA 4000S" manufactured by MAC Science
Specimen length: 20 mm
Specimen width: 2 mm
Temperature at which temperature rising starts: 25° C.
Temperature at which temperature rising finishes: 400° C.
Temperature rising speed: 5° C./minute
Atmosphere: argon
Initial load: 34.5 g/mm$^2$ <Evaluation of Polyimide Film: Slippage>

Two sheets of polyimide films were overlapped with mutually different surfaces (that is, not the same surfaces, the winding outer surface and the winding inner surface were overlapped with each other in the case where the polyimide film was wound in the form of a film roll), and the polyimide films overlapped were sandwiched with thumb and index finger and slightly rubbed, and the case where the polyimide film sheets were slipped was evaluated as "◯", and the case where the polyimide film sheets were not slipped was evaluated as "x". The winding outer surfaces or the winding inner surfaces may not be slipped, and this case is not included in the evaluation items. At the time of evaluation of slippage, the protection film on one surface of the polyimide film was removed.

<Evaluation of Polyimide Film: Roll Winding Property>

At the time of winding a long polyimide film on a winding roll (outer diameter of core rod: 15 cm) at a speed of 2 m/minute, the case where smooth winding without wrinkles could be carried out was evaluated as "◯", the case where wrinkles were partially generated was evaluated as "Δ", and the case where smooth winding could not be carried out because of generation of wrinkles or winding of the film on the roll was evaluated as "x".

<Evaluation of Polyimide Film: Warpage>

Squares of 50 mm×50 mm were cut out from each obtained polyimide film to obtain film specimens. At the time of cutting out the film specimens, the cutting was performed at three points so that the respective sides of each square were consistent with the longitudinal direction and the width direction and the centers of the squares were at points corresponding to (a) the center, (b) ⅓ of the entire width from the left end in the width direction, and (c) ⅓ of the entire width from the right end in the width direction.

The film specimens (a) to (c) were stood still on a plane in a manner of forming a concave shape, and the distances (h1, h2, h3, and h4; unit (mm)) of four corners from the plane were measured, and their average value was defined as quantity of warp (mm). The quantity of warp was divided by the distance (35.36 mm) from the respective corners to the center of each specimen to give percentage (%) (100×(quantity of warp (mm))/35.36) as warpage (%) and the average of the warpage of the film specimens (a) to (c) was calculated.

<Evaluation of Polyimide Film: Curl Degree>

Film specimens (a) to (c) similar to those used for the measurement of the warpage of each polyimide film were heated by a dry oven at 250° C. for 30 minutes, and thereafter the warpage was measured in the same manner for each film after the heat treatment, and the warpage (%) of each film after the heat treatment was defined as curl degree.

<Number of Craters and Crater Diameter on Polyimide Film Surface>

Measurement was carried out by the following AFM method. That is, the number of craters on the polyimide film surface was measured by using a scanning probe microscope provided with a surface physical property evaluation function ("SPA 300/nanonavi", manufactured by SII Nano Technology Inc.). The measurement was carried out in DFM mode, "DF3" or "DF20" manufactured by SII Nano Technology Inc. was used as a cantilever, "FS-20A" manufactured by SII Nano Technology Inc. was used as a scanner, the scanning range was 10 μm square, and the measurement resolution was 1024×512 pixel. After a secondary inclination correction was performed for the measurement image using software attached to the apparatus, the crater parts were observed. As shown in FIG. 7, each crater has a shape having a projected part rising from a flat part and a dented part in the center of the projected part. The diameter (the distance between the highest heights) in the cross section at the position of the highest heights of the rising part was defined as the diameter of the crater part (in FIG. 7, (1) is a view of a polyimide film in which the height of the unevenness was expressed by color gradation (white shows higher position and black shows lower position); (2) is an example showing a cross section of the unevenness of a white part of the polyimide film shown in (1); and (3) shows the diameter of the crater part). The measurement was carried out for arbitrary three crater parts to determine the diameters of the crater parts, and their average value was employed.

The number of craters was measured by particle analysis for each obtained measurement image of 10 μm square (AFM image) with image processing software "Image J". "Image J" is from an open source, developed in National Institutes of Health (NIH), and image treatment software in public domain. For more detail, first, binarization for separating higher parts and lower parts based on a certain threshold was carried out (see FIGS. 8(2) and 8(3)). In this case, the threshold value was defined as a value of the position higher than the maximum point of the distribution in the height direction of the AFM image by 12% of the diameter of the lubricant used (in the case where the lubricant diameter was 80 nm, the position higher by 10 nm). The binarization provided only white and black image (see FIG. 8(3)), and the number of circular shapes in this image was measured by image processing. That is, the circular shape recognition was carried out by painting out the inside of the surrounded circles and measuring the image logical product (see FIG. 8 (6)) of the image with painted out circles (see FIG. 8 (4)) and a reverse image without painting out (see FIG. 8 (5)) to extract only the inside of the circles (in FIG. 8, (1) is a view of a polyimide film in which the height of the unevenness was expressed by color gradation (white shows higher position and black shows lower position); (2) is an example showing a cross section of the unevenness of a white part of the polyimide film shown in (1) (the straight line is the threshold); (3) is an example of binarization based on the threshold; (4) is an example formed by painting out the circular parts; (5) is an example obtained by reversing (3); and (6) is a logical product of (4) and (5)).

The number of craters was calculated by counting craters with a diameter of 10 to 500 nm from the image of the logical product obtained in the processing. The measurement was carried out for arbitrary three points to determine the number of the craters, and their average value was employed.

<Ra Value of Polyimide Film Surface>

The Ra value (surface conformation) of the polyimide film surface was measured by using a scanning probe microscope provided with a surface physical property evaluation function ("SPA 300/nanonavi", manufactured by SII Nano Technology Inc.). The measurement was carried out in DFM mode, "DF3" or "DF20" manufactured by SII Nano Technology Inc. was used as a cantilever, "FS-20A" manufactured by SII Nano Technology Inc. was used as a scanner, the scanning range was 10 μm square, and the measurement resolution was 512×512 pixel. After a secondary inclination correction was performed for the measurement image using software attached to the apparatus, if there was noise along with the measurement, other planarization treatments (e.g., flattening treatment) were properly employed, the Ra value was calculated using software attached to the apparatus. The measurement was carried out for arbitrary three points to determine the Ra values, and their average value was employed.

<Glass Transition Temperature>

Using a DSC differential thermal analyzer, the glass transition temperature of each polyimide film was measured from the presence or absence of heat absorption and radiation attributed to the structural change in a range of room temperature to 500° C. The glass transition temperature was not observed in any polyimide film.

<Thickness of Coupling Treatment Layer>

Measurement of the thickness (nm) of the coupling treatment layer (SC layer) was carried out for the thickness of a coupling treatment layer formed on a washed Si wafer by an ellipsometry method using a spectroscopic ellipsometer ("FE-5000", manufactured by Photal) under the following conditions. In the case where glass was used as the substrate, samples were used which were separately obtained by applying a coupling agent on a washed Si wafer in the same manner as in respective Examples and Comparative Examples, followed by drying.

Reflection angle range: 45° to 80°
Wavelength range: 250 nm to 800 nm
Wavelength resolution: 1.25 nm
Spot diameter: 1 mm
tan Ψ: measurement precision ±0.01
cos Δ: measurement precision ±0.01
Measurement: rotating analysis method
Polarizer angle: 45 °
Incident angle: fixed at 70°
Analyzer: at every 11.25° in a range of 0 to 360°
Wavelength: 250 nm to 800 nm The thickness was calculated by fitting according to a nonlinear least-squares method. In this case, a model used was an Air/thin film/Si model and the wavelength dependencies C1 to C6 were calculated in accordance with the following expressions:

$$n = C3/\lambda^4 + C2/\lambda^2 + C1$$

$$k = C6/\lambda^4 + C5/\lambda^2 + C4.$$

<Delamination Strength>

Delamination strength (180-degree peel strength) was measured in accordance with the 180-degree peel method described in JIS C6471 under the following conditions. An un-bonded part of each polyimide film was formed on one side of each sample to be subjected to this measurement by designing the size of the polyimide film to 110 mm×2000 mm relatively to the substrate (glass) of 100 mm×1000 mm, and this part was used as an exposed core.

Name of apparatus: Autograph AG-IS, manufactured by SHIMADZU CORPORATION
Measurement temperature: room temperature
Peeling speed: 50 mm/minute
Atmosphere: atmospheric air
Measurement sample width: 1 cm (1) Delamination Strength of UV Non-Irradiation Part For the measurement of the delamination strength in a UV non-irradiation part, laminates separately fabricated in the same manner as in respective Examples and Comparative Examples were used except that UV irradiation was not carried out.

(2) Delamination strength of UV irradiation part

The measurement of the delamination strength in a UV irradiation part was carried out for the UV irradiation part of respective laminates subjected to UV irradiation.

(3) Heat Resistant Delamination Strength

Measurement of the heat resistant delamination strength was carried out using each sample obtained by placing each laminate (laminate subjected to UV irradiation) in a muffle furnace with a nitrogen atmosphere, heating the laminate at a temperature rising speed of 10° C./minute to 400° C., keeping the laminate as it was at 400° C. for 1 hour, and then cooling the laminate in atmosphere by opening the door of the muffle furnace.

(4) Acid Resistant Delamination Strength

Measurement of the acid resistant delamination strength was carried out using each sample obtained by immersing each laminate (laminate subjected to UV irradiation) in a 18 mass % hydrochloric acid solution at room temperature (23° C.) for 30 minutes, washing the laminate with water three times, and air-drying the laminate.

(5) Alkali Resistant Delamination Strength

Measurement of the alkali resistant delamination strength was carried out using each sample obtained by immersing each laminate (laminate subjected to UV irradiation) in a 2.38 mass % tetramethylammonium hydroxide (TMAH) solution at room temperature (23° C.) for 30 minutes, washing the laminate with water three times, and air-drying the laminate.

<Film Warpage after Peeling>

A notch was formed in the UV irradiation part of each laminate to peel the polyimide film from the substrate, and a film specimen in a square size of 50 mm×50 mm was obtained by cutting out the center part of the peeled polyimide film, and the warpage (%) of the specimen was measured in the same manner as in the warpage of the polyimide film to determine the measurement result as the film warpage after peeling.

<Lubricant Particle Diameter>

In the state of being dispersed in a solvent (dimethyl acetamide), the lubricants (inorganic particles) used in Production Examples were subjected to measurement of particle size distribution by a laser scattering particle distribution meter "LB-500" manufactured by Horiba Ltd. to calculate volume average particle diameter.

<Surface Composition Ratio>

The surface composition ratio was measured by an electron spectroscopy for chemical analyzer (ESCA). The measurement was carried out using "ESCA 5801 MC", manufactured by ULVAC-PHI, Inc., under the following conditions. At the time of the measurement, first, the presence or absence of other elements was observed by entire element scanning, and then the narrow scanning for existing elements was carried out to measure the existence ratio. Herein, each sample to be subjected to the measurement was loaded to a measurement chamber after preliminary evacuation was sufficiently performed, and before the measurement, no process of grinding the sample surface by ion irradiation or the like was performed.

X-ray for excitation: Mg, Kα beam

Photoelectron escape angle: 45°

Analysis diameter: φ 800 μm

Path energy: 29.35 eV (narrow scanning), 187.75 eV (entire element scanning)

Steps: 0.125 eV (narrow scanning), 1.6 eV (entire element scanning)

Analysis elements: C, O, N, Si, and all elements

Vacuum degree: $1 \times 10^{-8}$ Torr or lower

Production Examples 1 and 2

(Preparation of Polyamide Acid Solutions A1 and A2)

After a reaction container equipped with a nitrogen introduction pipe, a thermometer, and a stirring rod was replaced with nitrogen, 223 parts by mass of 5-amino-2-(p-aminophenyl)benzoxazole and 4416 parts by mass of N,N-dimethylacetamide were added and completely dissolved; and next, 217 parts by mass of pyromellitic acid dianhydride was added thereto in combination with a dispersion obtained by dispersing colloidal silica in dimethylacetamide ("Snowtex (registered trademark) DMAC-ST 30", manufactured by Nissan Chemical Industries, Ltd.) as a lubricant in an amount such that the addition amount of silica (lubricant) was as shown in Table 1 (mass % to the total weight of the polymer solid matter in the polyamide acid solution), and the mixture was stirred at a reaction temperature of 25° C. for 24 hours to obtain brown and viscous polyamide acid solutions A1 and A2.

TABLE 1

| | Unit | Production Example 1 | Production Example 2 |
|---|---|---|---|
| Polyamide acid solution | | A1 | A2 |
| Lubricant type | | Silica | — |
| Lubricant particle diameter | μm | 0.08 | — |
| Addition amount of lubricant | mass % | 0.4 | 0 |

Production Examples 3 and 4

(Preparation of Polyamide Acid Solutions B1 and B2)

After a reaction container equipped with a nitrogen introduction pipe, a thermometer, and a stirring rod was replaced with nitrogen, 545 parts by mass of pyromellitic anhydride and 500 parts by mass of 4,4'-diaminodiphenyl ether were dissolved in 8000 parts by mass of N,N-dimethylacetamide and the resultant was added thereto, and a dispersion obtained by dispersing colloidal silica in dimethylacetamide ("Snowtex (registered trademark) DMAC-ST 30", manufactured by Nissan Chemical Industries, Ltd.) was added as a lubricant in an amount such that the addition amount of silica (lubricant) was as shown in Table 2 (mass % to the total weight of the polymer solid matter in the polyamide acid solution), and the mixture was stirred while keeping the temperature at 20° C. or lower for 24 hours to obtain polyamide acid solutions B1 and B2.

TABLE 2

| | Unit | Production Example 3 | Production Example 4 |
|---|---|---|---|
| Polyamide acid solution | | B1 | B2 |
| Lubricant type | | Silica | — |
| Lubricant particle diameter | μm | 0.08 | — |
| Addition amount of lubricant | Mass % | 0.4 | 0 |

Production Examples 5 and 6

(Preparation of Polyamide Acid Solutions C1 and C2)

After a reaction container equipped with a nitrogen introduction pipe, a thermometer, and a stirring rod was replaced with nitrogen, 398 parts by mass of 3,3',4,4'-biphenyltetracarboxylic acid dianhydride and 147 parts by mass of p-phenylenediamine were dissolved in 4600 parts by mass of N,N-dimethylacetamide and the resultant was added thereto, and a dispersion obtained by dispersing colloidal silica in dimethylacetamide ("Snowtex (registered trademark) DMAC-ST 30", manufactured by Nissan Chemical Industries, Ltd.) was added as a lubricant in an amount such that the addition amount of silica (lubricant) was as shown in Table 3 (mass % to the total weight of the polymer solid matter in the polyamide acid solution), and the mixture was stirred at a reaction temperature of 25° C. for 24 hours to obtain brown and viscous polyamide acid solutions C1 and C2.

TABLE 3

| | Unit | Production Example 5 | Production Example 6 |
|---|---|---|---|
| Polyamide acid solution | | C1 | C2 |
| Lubricant type | | Silica | — |
| Lubricant particle diameter | μm | 0.08 | — |
| Addition amount of lubricant | Mass % | 0.4 | 0 |

Production Example 7

(Preparation of Polyamide Acid Solution D)

After a reaction container equipped with a nitrogen introduction pipe, a thermometer, and a stirring rod was replaced with nitrogen, 16.1 g (0.05 mol) of 2,2'-bis(trifluoromethyl)benzidine and 109 g of N-methyl-2-pyrrolidone were loaded to be dissolved, and then 11.2 g (0.05 mol) of 1,2,4,5-cyclohexanetetracarboxylic acid dianhydride was separately added as it was in a solid state at room temperature, and stirred for 12 hours under room temperature. Next, as an azeotropic solvent, 40.0 g of xylene was added, and reaction was carried out for 3 hours after heating to 180° C., and then azeotropically produced water was separated. After it was confirmed that the water was removed by distillation, the obtained mixture was heated to 190° C. over 1 hour to remove xylene, thereby obtaining a reaction solution. To this reaction solution was added a dispersion obtained by dispersing colloidal silica in dimethylacetamide ("Snowtex (registered trademark) DMAC-ST 30", manufactured by Nissan Chemical Industries, Ltd.) as a lubricant in an amount such that the addition amount of silica was 0.2 mass % to the total weight of the polymer solid matter in the polyamide acid solution, and thus a polyamide acid solution D was obtained.

<<Film Fabrication Example 1>>

An inorganic lubricant surface of a polyethylene terephthalate (PET) film ("A-4100", manufactured by TOYOBO CO., LTD.) as a film formation substrate was coated with the polyamide acid solution A1 by a comma coater so that a dry thickness shown in Table 4 as "(b-layer) thickness" was given, and dried at 110° C. for 5 minutes, and thereafter together with the PET film (without peeled from the PET film), a monolayer polyamide acid film was wound.

The monolayer polyamide acid film wound together with the PET film as a film formation substrate was attached to the unwind part of a film formation machine, and the monolayer polyamide acid film surface was coated with the polyamide acid solution A2 by using a comma coater so that a dry thickness shown in Table 4 as "(a-layer) thickness" was given, and dried at 110° C. for 20 minutes to obtain a multilayer polyamide acid film with two layer configuration on the PET film as a film formation substrate.

Next, the obtained multilayer polyamide acid film with two layer configuration was peeled from the PET film as a film formation substrate, allowed to pass through a pin tenter having three heat treatment zones, subjected to heat treatment of 150° C.×2 minutes at the first stage, 220° C.×2 minutes at the second stage and 475° C.×4 minutes at the third stage, and then slit into 500 mm width to obtain a multilayer structure polyimide film 1. After the heat treatment, as a peelable non-polyimide protection film, a PET film having a slight pressure-sensitive adhesive layer on one surface (protection film A) was laminated on the a-layer side (in Example, the polyamide acid solution A2 side) and then the polyamide acid film was wound. The physical properties of the obtained polyimide film are shown in Table 4.

Herein, the protection film A was stuck for the purpose of preventing foreign matter adhesion to the film surface, scratching, etc., and at the time of transportation by roll-to-roll at relatively low temperature or at the time of manual handling, the process was carried out in the state where the protection film A was stuck. However, at the time of press or lamination under the conditions of, for example, exceeding 130° C., or at the time of carrying out respective treatments on the surface to which the protection film A was stuck, the respective treatments were performed after the protection film A was peeled.

<<Film Fabrication Example 2>>

A polyimide film 2 was obtained in the same manner as in Film Fabrication Example 1, except that the application amounts of the polyamide acid solutions A1 and A2 were changed so that the dry thicknesses as shown in Table 4 were given, respectively. The physical properties of the obtained polyimide film are shown in Table 4.

<<Film Fabrication Example 3>>

A polyimide film 3 was obtained in the same manner as in Film Fabrication Example 1, except that the application order of the polyamide acid solutions A1 and A2 was changed (that is, the b-layer was formed using the polyamide acid solution A2 and the a-layer was formed using the polyamide acid solution A1), and the application amounts of the polyamide acid solutions A1 and A2 were changed so that the dry thicknesses as shown in Table 4 were given, respectively. The physical properties of the obtained polyimide film are shown in Table 4.

<<Film Fabrication Example 4>>

A polyimide film 4 was obtained in the same manner as in Film Fabrication Example 1, except that the application amounts of the polyamide acid solutions A1 and A2 were changed so that the dry thicknesses as shown in Table 4 were given, respectively. The physical properties of the obtained polyimide film are shown in Table 4.

<<Film Fabrication Example 5>>

A polyimide film 5 was obtained in the same manner as in Film Fabrication Example 1, except that the polyamide acid solution A2 was not applied (that is, the a-layer was not formed), and the application amount of the polyamide acid solutions A1 was changed so that the dry thickness as shown in Table 5 was given. The physical properties of the obtained polyimide film are shown in Table 5.

<<Film Fabrication Example 6>>

A polyimide film 6 was obtained in the same manner as in Film Fabrication Example 1, except that the polyamide acid solution A1 was changed to B1, the polyamide acid solution A2 was changed to B2, and the application amounts of the polyamide acid solutions B1 and B2 were changed so that the dry thicknesses as shown in Table 5 were given, respectively. The physical properties of the obtained polyimide film are shown in Table 5.

<<Film Fabrication Example 7>>

A polyimide film 7 was obtained in the same manner as in Film Fabrication Example 1, except that the polyamide acid solution A1 was changed to C1, the polyamide acid solution A2 was changed to C2, and the application amounts of the polyamide acid solutions C1 and C2 were changed so that the dry thicknesses as shown in Table 5 were given, respectively. The physical properties of the obtained polyimide film are shown in Table 5.

<<Film Fabrication Example 8>>

A polyimide film 8 was obtained in the same manner as in Film Fabrication Example 1, except that the polyamide acid solution A1 was changed to C1, the polyamide acid solution A2 was not applied (that is, the a-layer was not formed), and the application amount of the polyamide acid solutions C1 was changed so that the dry thicknesses as shown in Table 5 were given, respectively. The physical properties of the obtained polyimide film are shown in Table 5.

<<Film Fabrication Example 9>>

A polyimide film 9 was obtained in the same manner as in Film Production Example 1, except that the polyamide acid solution A1 was changed to D, the polyamide acid solution A2 was not applied (that is, the a-layer was not formed), the application amount of the polyamide acid solution D was changed so that the dry thickness as shown in Table 5 was given, and further the temperature of the heat treatment at the third stage was changed to 280° C. The physical properties of the obtained polyimide film are shown in Table 5.

<<Films 10 and 11>>

A commercialized product, "Kapton (registered trademark) 100H" manufactured by DU PONT-TRAY CO., LTD. was used as a film 10 and a commercialized product, "Upilex (registered trademark) 25S" manufactured by Ube Industries, Ltd. was used as a film 11.

TABLE 4

| | Fabrication Example 1 | Fabrication Example 2 | Fabrication Example 3 | Fabrication Example 4 |
|---|---|---|---|---|
| (for a-layer) Polyamide acid solution | A2 | A2 | A1 | A2 |
| (for b-layer) Polyamide acid solution | A1 | A1 | A2 | A1 |
| (a-layer) Thickness (μm) | 28 | 5 | 28 | 5 |
| (b-layer) Thickness (μm) | 7 | 25 | 7 | 5 |
| (a)/(b) | 4 | 0.2 | 4 | 1 |
| Film NO. | 1 | 2 | 3 | 4 |

TABLE 4-continued

|  | Fabrication Example 1 | Fabrication Example 2 | Fabrication Example 3 | Fabrication Example 4 |
|---|---|---|---|---|
| Polyimide film thickness (μm) | 35 | 30 | 35 | 10 |
| Polyimide film CTE (ppm/° C.)* | 3 | 3 | 3 | 2 |
| Polyimide film tensile elasticity (GPa)* | 7.5 | 7.3 | 7.7 | 7.5 |
| Polyimide film Tensile strength (MPa)* | 440 | 430 | 450 | 430 |
| Polyimide film tensile elongation at break (%)* | 32 | 35 | 33 | 36 |
| Evaluation: Slippage | ○ | ○ | ○ | ○ |
| Evaluation: Roll winding property | ○ | ○ | ○ | ○ |
| Evaluation: Warpage (%) | 0.0 | 0.0 | 0.1 | 0.0 |
| Evaluation: Curl degree (%) | 0.0 | 0.0 | 0.1 | 0.1 |

*The average value of the value in the machine direction (MD direction) and the value in the transverse direction (TD direction).

TABLE 5

|  | Fabrication Example 5 | Fabrication Example 6 | Fabrication Example 7 | Fabrication Example 8 | Fabrication Example 9 |
|---|---|---|---|---|---|
| (for a-layer) Polyamide acid solution | — | B2 | C2 | — | — |
| (for b-layer) Polyamide acid solution | A1 | B1 | C1 | C1 | D |
| (a-layer) Thickness (μm) | 0 | 7 | 7 | 0 | 0 |
| (b-layer) Thickness (μm) | 38 | 28 | 28 | 38 | 38 |
| (a)/(b) | 0 | 0.25 | 0.25 | 0 | 0 |
| Film NO. | 5 | 6 | 7 | 8 | 9 |
| Polyimide film thickness (μm) | 38 | 35 | 35 | 38 | 51 |
| Polyimide film CTE (ppm/° C.)* | 3 | 15 | 13 | 15 | 55 |
| Polyimide film tensile elasticity (GPa)* | 7.5 | 4.1 | 8.2 | 8.1 | 3.6 |
| Polyimide film tensile strength (MPa)* | 490 | 360 | 520 | 500 | 280 |
| Polyimide film tensile elongation at break (%)* | 35 | 65 | 52 | 49 | 54 |
| Evaluation: Slippage | ○ | ○ | ○ | ○ | ○ |
| Evaluation: Roll winding property | ○ | ○ | ○ | ○ | ○ |
| Evaluation: Warpage (%) | 0.0 | 0.8 | 0.3 | 0.3 | 0.2 |
| Evaluation: Curl degree (%) | 0.0 | 1.4 | 0.5 | 0.4 | 0.5 |

*The average value of the value in the machine direction (MD direction) and the value in the transverse direction (TD direction).

<<Film Treatment Examples 1 to 4>>

For the films 1 to 4, the surfaces of the polyimide side (the side of the layer formed using the polyamide acid solution A2) containing no lubricant in the respective polyimide films were subjected to vacuum plasma treatment. The vacuum plasma treatment was carried out by employing treatment with RF plasma in RIE mode using parallel flat type electrodes so that $O_2$ gas was introduced into a vacuum chamber, high frequency electric power of 13.56 MHz was applied, and treatment time was set to 3 minutes. The physical properties of the obtained respective polyimide films after the treatment are shown in Table 6. Since no acid treatment (HF treatment) was carried out, no crater was observed in the obtained respective polyimide films after the treatment.

<<Film Treatment Examples 5 to 7>>

For the films 3 to 5, the surfaces of the polyimide side (the side of the layer formed using the polyamide acid solution A1) containing the lubricant in the respective polyimide films were subjected to vacuum plasma treatment, and successively the same surfaces were subjected to acid treatment, air-dried, and then subjected to dewatering treatment by placing on a hot plate at 110° C. for 1 hour. The vacuum plasma treatment was carried out by employing treatment with RF plasma in RIE mode using parallel flat type electrodes so that $O_2$ gas was introduced into a vacuum chamber, high frequency electric power of 13.54 MHz was applied, and treatment time was set to 3 minutes. Successively, the acid treatment was carried out by immersion in an aqueous 10 mass % HF solution for 1 minute, followed by washing and drying. The physical properties of the obtained respective polyimide films after the treatment are shown in Table 7.

<<Film Treatment Examples 8 and 9>>

For the films 6 and 7, vacuum plasma treatment was carried out in the same manner as in Film Treatment Example 1 above. The physical properties of the obtained respective polyimide films after the treatment are shown in Table 7. Since no acid treatment (HF treatment) was carried out, no crater was observed in the obtained respective polyimide films after the treatment.

<<Film Treatment Examples 10 to 14>>

For the films 7 to 11, vacuum plasma treatment, acid treatment, air drying, and dewatering treatment were carried out in the same manner as in Film Treatment Example 5 above. The physical properties of the obtained respective polyimide films after the treatment are shown in Table 8.

TABLE 6

| | Film Treatment Example 1 | Film Treatment Example 2 | Film Treatment Example 3 | Film Treatment Example 4 |
|---|---|---|---|---|
| Film NO. | 1 | 2 | 3 | 4 |
| CTE (machine direction) (ppm/° C.) | 2.8 | 3.1 | 2.9 | 2.2 |
| CTE (transverse direction) (ppm/° C.) | 3.0 | 3.0 | 3.1 | 2.0 |
| Tensile elasticity (machine direction) (GPa) | 7.1 | 7.5 | 7.7 | 7.1 |
| Tensile elasticity (transverse direction) (GPa) | 7.3 | 7.0 | 7.8 | 6.9 |

TABLE 7

| | Film Treatment Example 5 | Film Treatment Example 6 | Film Treatment Example 7 | Film Treatment Example 8 | Film Treatment Example 9 |
|---|---|---|---|---|---|
| Film NO. | 3 | 4 | 5 | 6 | 7 |
| CTE (machine direction) (ppm/° C.) | 3.7 | 1.4 | 2.3 | 15.7 | 12.5 |
| CTE (transverse direction) (ppm/° C.) | 2.9 | 2.0 | 3.1 | 15.2 | 13.2 |
| Tensile elasticity (machine direction) (GPa) | 7.9 | 6.8 | 7.5 | 3.8 | 8.0 |
| Tensile elasticity (transverse direction) (GPa) | 7.5 | 7.7 | 7.2 | 3.3 | 7.7 |
| Number of craters on surface* | 34 | 36 | 37 | 0 | 0 |
| Diameter of craters on surface (nm)* | 82 | 95 | 95 | — | — |
| Ra value of surface (nm) | 0.6 | 0.7 | 0.5 | — | — |

*The number of craters is the average number of craters with a diameter of 10 nm to 500 nm per 100 μm² and the crater diameter is the average value thereof.

TABLE 8

| | Film Treatment Example 10 | Film Treatment Example 11 | Film Treatment Example 12 | Film Treatment Example 13 | Film Treatment Example 14 |
|---|---|---|---|---|---|
| Film NO. | 7 | 8 | 9 | 10 | 11 |
| CTE (machine direction) (ppm/° C.) | 12.9 | 15.4 | 3.9 | 16.3 | 13.5 |
| CTE (transverse direction) (ppm/° C.) | 13.3 | 14.8 | 2.7 | 17.2 | 13.8 |
| Tensile elasticity (machine direction) (GPa) | 4.3 | 8.7 | 3.6 | 4.1 | 8.9 |
| Tensile elasticity (transverse direction) (GPa) | 3.7 | 8.5 | 3.5 | 3.9 | 8.7 |
| Number of craters on surface* | 30 | 14 | 35 | 12 | 24 |
| Diameter of craters on surface (nm)* | 109 | 112 | 115 | 470 | 104 |
| Ra value of surface (nm) | 0.5 | 0.6 | 0.6 | 0.7 | 0.6 |

*The number of craters is the average number of craters with a diameter of 10 nm to 500 nm per 100 μm² and the crater diameter is the average value thereof.

Examples 1 to 4

After 3-aminopropyltrimethoxysilane as a silane coupling agent (SC agent) was diluted with isopropyl alcohol to 0.5 mass % while nitrogen gas was led to a glove box replaced with nitrogen, glass ("Corning EAGLE XG", manufactured by Corning Incorporated; 100 mm×100 mm×0.7 mm thickness), which was previously and separately washed and dried as a substrate (basal plate) made of an inorganic substance, was set on a spin coater, the silane coupling agent (SC) was dropped for application on the rotating center of the glass to wet the entire surface of the substrate by rotating the substrate at 500 rpm and then at 2000 rpm, followed by drying. The resulting substrate was heated for 1 minute on a hot plate heated to 110° C. and set in a clean bench to obtain a coupling agent-treated substrate having a coupling treatment layer with a thickness of 11 nm.

Next, a polyimide film cut out in a pattern of 70 mm×70 mm (□ 70 mm) as a mask was put on the coupling treatment layer side of the obtained substrate having a coupling treatment layer, and UV irradiation treatment was carried out in the range of 70 mm×70 mm (□ 70 mm) while leaving 15 mm of the circumference of the laminate.

UV irradiation was carried out using a UV/$O_3$ washing and reforming apparatus ("SKB 1102N-01") and a UV lamp ("SE-1103G05") manufactured by Lan Technical Service Co., Ltd., for 4 minute at a distance of about 3 cm from the UV lamp. No special gas was introduced into the UV/$O_3$ washing and reforming apparatus at the time of irradiation, and UV radiation was carried out at room temperature in atmospheric air. The UV lamp emitted bright lines with a wavelength of 185 nm (short wavelength capable of generating ozone for accelerating inactivation treatment) and of 254 nm, and at that time the illuminance was about 20 mW/cm² (measured at 254 nm wavelength by an illuminometer ("ORC UV-M03AUV").

Next, the coupling agent-treated and UV irradiation-treated surface of the substrate after the UV irradiation treatment and the treated surface of each polyimide film after the treatment obtained by Film Treatment Example 1 to 4 (the surface in the side of the layer formed using the polyamide acid solution A2 in Examples 1 to 4) were overlapped with each other and were subjected to pressurizing and heating treatment by vacuum-pressing at 300° C. for 10 minutes under 10 MPa pressure, while making a vacuum degree of $10^{+2}$ Pa by a rotary pump, to obtain each laminate of the present invention.

The evaluation results of the obtained laminates are shown in Table 9.

Separately, the coupling agent-treated surface of the substrate having a coupling treatment layer obtained above and the treated surface of each polyimide film after the treatment obtained by Film Treatment Example 1 to 4 (the surface in the side of the layer formed using the polyamide acid solution A2 in Examples 1 to 4) were overlapped with each other and were subjected to pressurizing and heating treatment by vacuum-pressing which is the same as described above to fabricate each sample for measuring delamination strength of the UV non-irradiation part.

Example 5

A laminate of the present invention was obtained in the same manner as in Example 2, except that a silicon wafer (Si wafer) with a thickness of 0.725 μm was used as the substrate (basal plate) made of an inorganic substance.

The evaluation results of the obtained laminate are shown in Table 9.

In addition, laminates were obtained in the same manner as described above, except that a silicon wafer was used in place of the glass as the substrate made of an inorganic substance for the respective Examples other than Example 2; however, the evaluation results of the obtained laminates were almost the same as those in the case of using the glass as the substrate.

Examples 6 to 15

Laminates of the present invention were obtained in the same manner as in Example 1, except that treated polyimide films obtained in Treatment Examples 5 to 14 were used as the polyimide films after film treatment for overlapping with the substrate, and that the coupling agent-treated surface of the glass subjected to the coupling agent treatment and the treated surface of each treated polyimide film were overlapped with each other.

The evaluation results of the obtained laminates are shown in Table 10 and Table 11.

Examples 16 and 17

Laminates of the present invention were obtained in the same manner as in Example 2 or Example 10, except that the pressurizing and heating treatment was carried out by roll lamination at 150° C. and successively press was carried out at 300° C. for 20 minutes under 8 MPa pressure in atmospheric air.

The evaluation results of the obtained laminates are shown in Table 12.

Examples 18 to 20

Laminates of the present invention were obtained in the same manner as in Example 2, Example 9, or Example 10, except that the pressurizing and heating treatment was carried out by pressurization with roll lamination at 100° C. and a roll pressure (linear pressure) of 20 N/cm (effective pressurization width 5 mm, estimated effective pressure about 0.4 MPa), and then heating in a dry oven at 200° C. under normal pressure for 1 hour.

The evaluation results of the obtained laminates are shown in Table 12.

TABLE 9

|  | Example 1 | Example 2 | Example 3 | Example 4 | Example 5 |
|---|---|---|---|---|---|
| Polyimide film NO. | 1 | 2 | 3 | 4 | 2 |
| Film treatment | 1 | 2 | 3 | 4 | 2 |
| Inorganic substrate material | Glass | Glass | Glass | Glass | Si wafer |
| SC treatment layer thickness (nm) | 11 | 11 | 11 | 11 | 11 |
| Delamination strength of UV non-irradiation part (N/cm) | 2.0 | 2.4 | 2.5 | 2.1 | 2.4 |
| Delamination strength of UV irradiation part (N/cm) | 0.2 | 0.2 | 0.1 | 0.2 | 0.2 |
| Heat resistant delamination strength (N/cm) | 2.1 | 2.0 | 2.6 | 2.1 | 2.2 |
| Acid resistant delamination strength (N/cm) | 1.8 | 2.0 | 2.0 | 2.4 | 1.6 |
| Alkali resistant delamination strength (N/cm) | 1.9 | 1.8 | 2.3 | 1.5 | 2.1 |
| Film warpage after peeling (%) | 0.2 | 0.3 | 0.2 | 0.1 | 0.0 |

TABLE 10

|  | Example 6 | Example 7 | Example 8 | Example 9 | Example 10 |
|---|---|---|---|---|---|
| Polyimide film NO. | 3 | 4 | 5 | 6 | 7 |
| Film treatment | 5 | 6 | 7 | 8 | 9 |
| Inorganic substrate material | Glass | Glass | Glass | Glass | Glass |
| SC treatment layer thickness (nm) | 11 | 11 | 11 | 11 | 11 |
| Delamination strength of UV non-irradiation part (N/cm) | 2.4 | 1.5 | 1.8 | 3.0 | 1.9 |

TABLE 10-continued

|  | Example 6 | Example 7 | Example 8 | Example 9 | Example 10 |
|---|---|---|---|---|---|
| Delamination strength of UV irradiation part (N/cm) | 0.2 | 0.2 | 0.3 | 0.2 | 0.2 |
| Heat resistant delamination strength (N/cm) | 1.6 | 1.5 | 1.4 | 2.4 | 1.4 |
| Acid resistant delamination strength (N/cm) | 1.5 | 1.2 | 1.6 | 3.0 | 1.9 |
| Alkali resistant delamination strength (N/cm) | 1.8 | 1.8 | 1.9 | 3.1 | 2.1 |
| Film warpage after peeling (%) | 0.2 | 0.3 | 0.2 | 1.2 | 0.7 |

TABLE 11

|  | Example 11 | Example 12 | Example 13 | Example 14 | Example 15 |
|---|---|---|---|---|---|
| Polyimide film NO. | 7 | 8 | 9 | 10 | 11 |
| Film treatment | 10 | 11 | 12 | 13 | 14 |
| Inorganic substrate material | Glass | Glass | Glass | Glass | Glass |
| SC treatment layer thickness (nm) | 11 | 11 | 11 | 11 | 11 |
| Delamination strength of UV non-irradiation part (N/cm) | 2.1 | 1.9 | 2.6 | 2.2 | 1.7 |
| Delamination strength of UV irradiation part (N/cm) | 0.2 | 0.2 | 0.1 | 0.1 | 0.1 |
| Heat resistant delamination strength (N/cm) | 2.2 | 1.5 | 1.7 | 1.9 | 1.9 |
| Acid resistant delamination strength (N/cm) | 1.9 | 2.2 | 1.2 | 2.2 | 2.3 |
| Alkali resistant delamination strength (N/cm) | 1.6 | 1.7 | 1.6 | 1.9 | 1.6 |
| Film warpage after peeling (%) | 0.6 | 1.0 | 0.5 | 5.4 | 3.2 |

TABLE 12

|  | Example 16 | Example 17 | Example 18 | Example 19 | Example 20 |
|---|---|---|---|---|---|
| Polyimide film NO. | 2 | 7 | 2 | 6 | 7 |
| Film treatment | 2 | 9 | 2 | 8 | 9 |
| Inorganic substrate material | Glass | Glass | Glass | Glass | Glass |
| SC treatment layer thickness (nm) | 11 | 11 | 11 | 11 | 11 |
| Delamination strength of UV non-irradiation part (N/cm) | 2.4 | 2.9 | 2.8 | 3.5 | 2.2 |
| Delamination strength of UV irradiation part (N/cm) | 0.2 | 0.3 | 0.3 | 0.3 | 0.2 |
| Heat resistant delamination strength (N/cm) | 2.1 | 2.2 | 2.7 | 3.2 | 1.8 |
| Acid resistant delamination strength (N/cm) | 2.1 | 3.1 | 2.5 | 3.0 | 1.6 |
| Alkali resistant delamination strength (N/cm) | 1.9 | 3.0 | 2.6 | 3.0 | 1.6 |

TABLE 12-continued

|  | Example 16 | Example 17 | Example 18 | Example 19 | Example 20 |
|---|---|---|---|---|---|
| Film warpage after peeling (%) | 0.3 | 4.5 | 0.1 | 5.4 | 2.4 |

Example 21

Onto a glass plate ("Corning EAGLE XG" manufactured by Corning Incorporated, 370×470 mm×0.7 mm thickness) was applied a solution of 0.5 mass % n-propylethoxysilane in isopropanol by using an automatic application type spin coater "MSC 800-C-AD model" manufactured by Japancreate Co., Ltd., and after the solution was shaken off at 2000 rpm and the rotation was stopped, the glass plate taken out was set on a dry oven, which was replaced with dry nitrogen, at 120° C. for 15 minutes to carry out silane coupling agent treatment, and a silane coupling treatment layer with a thickness of 40 nm was formed.

A metal mask (having a pattern in which rectangular apertures of 68 mm×110 mm were alternately arranged in array-like state via shielding parts with 5 mm width, and being coated with insulating coating on the surface) was overlapped with the obtained treated glass plate having a coupling treatment layer, and after confirming that there was no gap between the metal mask and the glass plate, UV irradiation was carried out in the same manner as in Example 1.

Next, the treated film obtained in Film Treatment Example 9 was cut into a size of 350 mm×450 mm, and it was set together with the glass plate in a roll laminator manufactured by MCK so that the film treatment surface and the treated surface of the glass plate faced to each other, and in the state where the glass plate was heated at 80° C., lamination at a linear pressure of 50 N/cm (estimated effective pressure about 1 MPa) was carried out to obtain a temporary film/glass laminate. This temporary film/glass laminate was preliminarily heated in a dry oven at 125° C. for 10 minutes, and then heated in an oven at 180° C. for 30 minutes to obtain a laminate of the present invention The evaluation results of the obtained laminate are shown in Table 13.

Example 22

A laminate of the present invention was obtained in the same manner as in Example 21, except that the inactivation treatment was changed to the following atmospheric plasma treatment.

The atmospheric plasma treatment was carried out in such a manner that a direct type atmospheric pressure plasma treatment apparatus having a mechanism for automatically moving a slit-like transversely long head on a work was used; a gas mixture at a flow rate of nitrogen/oxygen=95/5 (normal pressure volume ratio) as a treatment gas was used; and the electric discharge output power was set to 2 kW. The time for exposing the glass plate to the plasma was about 60 seconds.

The evaluation results of the obtained laminate are shown in Table 13.

Example 23

A laminate of the present invention was obtained in the same manner as in Example 21, except that the inactivation treatment was changed to the following corona treatment.

The corona treatment was carried out at 40 w/m$^2$ for 3 minutes in atmospheric air by using a conveyer type treatment apparatus manufactured by Kasuga Electric Works Ltd.

The evaluation results of the obtained laminate are shown in Table 13.

Example 24

A laminate of the present invention was obtained in the same manner as in Example 22, except that the polyimide film used in Example 22 was changed to the film obtained in Film Treatment Example 14.

The evaluation results of the obtained laminate are shown in Table 13.

Example 25

A laminate of the present invention was obtained in the same manner as in Example 23, except that the polyimide film used in Example 23 was changed to the film obtained in Film Treatment Example 14.

The evaluation results of the obtained laminate are shown in Table 13.

TABLE 13

|  | Example 21 | Example 22 | Example 23 | Example 24 | Example 25 |
|---|---|---|---|---|---|
| Polyimide film NO. | 7 | 7 | 7 | 11 | 11 |
| Film treatment | 9 | 9 | 9 | 14 | 14 |
| Inorganic substrate material | Glass | Glass | Glass | Glass | Glass |
| SC treatment layer thickness (nm) | 40 | 40 | 40 | 40 | 40 |
| Inactivation treatment | UV ozone treatment | Atmospheric pressure plasma treatment | Corona treatment | Atmospheric pressure plasma treatment | Corona treatment |

TABLE 13-continued

|  | Example 21 | Example 22 | Example 23 | Example 24 | Example 25 |
|---|---|---|---|---|---|
| Delamination strength of inactivation non-treatment part (N/cm) | 3.2 | 3.0 | 2.7 | 2.8 | 3.1 |
| Delamination strength of inactivation treatment part (N/cm) | 0.6 | 0.6 | 0.4 | 0.5 | 0.5 |
| Heat resistant delamination strength (N/cm) | 2.9 | 2.8 | 2.7 | 2.7 | 3.0 |
| Acid resistant delamination strength (N/cm) | 3.0 | 2.9 | 2.5 | 2.6 | 2.8 |
| Alkali resistant delamination strength (N/cm) | 2.9 | 3.0 | 2.4 | 2.6 | 2.9 |

Example 26

A thin film transistor array was simulatively produced by using the laminate plate obtained in Example 1 and low temperature polysilicon on the film of the laminate. A silicon oxide layer formed as a leveling layer and gas-barrier layer by a reactive sputtering method, a tantalum layer formed as a source-drain electrode layer by a sputtering method, a barrier metal layer, and an amorphous silicon layer formed by a CVD method as a semiconductor layer were laminated by using prescribed test patterns. Next, after the silicon layer was micro-crystallized by annealing at 400° C. for 75 minutes, a SiN layer as a gate insulating layer and aluminum as a gate electrode layer were overlapped. The respective layers were patterned by masking or a photolithographic method corresponding to the test patterns to obtain a simulative device: a thin film transistor array. The device part was formed in the UV irradiation part (aperture part of the mask) at the time of inactivation treatment. In the processes, the laminate was exposed to vacuum atmosphere, high temperature, a resist solution, a developing solution, an etching solution, and a release solution used for the photolithographic method, but the polyimide layer was not peeled from the glass layer and showed good processing suitability.

Next, corresponding to the pattern of the mask used for the inactivation treatment, a notch was formed in the polyimide film along the boundary of the UV non-irradiation parts (the shielding part of the mask) and the UV irradiation part (the aperture part of the mask), and the part in which the device was formed was peeled. At the time of the peeling, the edge part was slightly lifted with a thin blade and then the peeling could be carried out quickly by inserting and pushing the blade into the interface of the film and the glass. The angle of the glass to the film was about 15 to 20 degree at the time of peeling. In addition, the peeling was carried out similarly for the shielded part with 5 mm width, but it was difficult to peel the polyimide film without breakage.

Comparative Examples 1 to 3

Laminates for comparison were obtained in the same manner as in Example 1, except that the respective films (polyimide film not subjected the plasma treatment) of NOs. 1, 2, and 7 obtained in Film Production Examples 1, 2, and 7 were used and the side containing no lubricant was overlapped with the glass with the side facing the glass.

The evaluation results of the obtained laminates are shown in Table 14.

Comparative Examples 4 and 5

Laminates for comparison were obtained in the same manner as in Example 2 or 10, except that no coupling agent treatment was carried out for the substrate.

The evaluation results of the obtained laminates are shown in Table 14. In the table, "unmeasurable" refers to the case where the polyimide film was peeled in the middle of the treatment or measurement.

TABLE 14

|  | Comparative Example 1 | Comparative Example 2 | Comparative Example 3 | Comparative Example 4 | Comparative Example 5 |
|---|---|---|---|---|---|
| Polyimide film NO. | 1 | 2 | 7 | 2 | 7 |
| Film treatment | None | None | None | 2 | 9 |
| Inorganic substrate material | Glass | Glass | Glass | Glass | Glass |
| SC treatment layer thickness (nm) | 11 | 11 | 11 | None | None |
| Delamination strength of UV non-irradiation part (N/cm) | 0.2 | 0.2 | 0.3 | 0.1 | 0.1 |

TABLE 14-continued

|  | Comparative Example 1 | Comparative Example 2 | Comparative Example 3 | Comparative Example 4 | Comparative Example 5 |
|---|---|---|---|---|---|
| Delamination strength of UV irradiation part (N/cm) | 0.1 | 0.2 | 0.1 | 0.1 | 0.1 |
| Heat resistant delamination strength (N/cm) | Immeasurable | Immeasurable | Immeasurable | Immeasurable | Immeasurable |
| Acid resistant delamination strength (N/cm) | 0.1 | 0.1 | 0.1 | Immeasurable | Immeasurable |
| Alkali resistant delamination strength (N/cm) | 0.1 | 0.1 | 0.1 | Immeasurable | Immeasurable |

Comparative Examples 6 and 7

Laminates for comparison were obtained in the same manner as in Example 2 or 10, except that no UV irradiation treatment was carried out.

The evaluation results of the obtained laminates are shown in Table 15. In the table, "unmeasurable" refers to the case where the polyimide film was peeled in the middle of the treatment or measurement.

For each of the laminate, although a notch was formed in the polyimide film and the film was peeled from the substrate, peeling could not be carried out well and when forcible peeling was tried, the film was torn.

TABLE 15

|  | Comparative Example 6 | Comparative Example 7 |
|---|---|---|
| Polyimide film NO. | 2 | 7 |
| Film treatment | 2 | 9 |
| Inorganic substrate material | Glass | Glass |
| SC treatment layer thickness (nm) | 11 | 11 |
| Delamination strength of UV non-irradiation part (N/cm) | 2.5 | 2.3 |
| Delamination strength of UV irradiation part (N/cm) | UV irradiation part non-existence | UV irradiation part non-existence |
| Heat resistant delamination strength (N/cm) | 2.8 | 1.2 |
| Acid resistant delamination strength (N/cm) | 1.7 | 2.2 |
| Alkali resistant delamination strength (N/cm) | 1.9 | 2.0 |

Comparative Example 8

While a circular protection film with 80 mm diameter made of a PET film was stuck to the center of glass ("Corning EAGLE XG", manufactured by Corning Incorporated; 100 mm×100 mm×0.7 mm thickness), the glass was set on a spin coater, and the silane coupling agent which was the same as that of Example 1 was dropped for application on the rotating center of the glass to wet the entire surface of the substrate by rotating the substrate at 500 rpm and then at 2000 rpm, followed by drying. The resulting substrate was heated for 1 minute on a hot plate heated to 110° C. and set in a clean bench, the protection film was then peeled to obtain a glass basal plate having the silane coupling agent applied only on the circumference.

Next, the treated surface of the polyimide film after treatment obtained in Film Treatment Example 1 was overlapped with the silane coupling agent-coated surface, and then the resultant was subjected to pressurizing and heating treatment by vacuum-pressing at 300° C. for 10 minutes under 10 MPa pressure, while making a vacuum degree of $10^{+2}$ Pa by a rotary pump, to obtain a laminate for comparison. Herein, no UV irradiation was carried out.

The adhesion strength of the silane coupling agent-treated part of the obtained laminate was 2.1 N/cm, which was the same as that in the UV non-irradiation part of Example 1. No adhesion was given in the silane coupling agent-uncoated part in the center of the glass basal plate. When the heat resistant delamination strength test was carried out for the laminate, the film/glass interface in the center part of the laminate was significantly blistered. Similarly, the film/glass interface was blistered in the acid resistant delamination strength test and the alkali resistant delamination strength test.

(Measurement Examples 1 to 5)

Five sheets of a Si wafer cut into 50 mm×50 mm (☐ 50 mm) were prepared as a substrate (basal plate) and sufficiently washed, and after a silane coupling agent was applied in the same manner as in Example 1, each sheet was heated by a hot plate at 110° C. to form a coupling treatment layer with 11 nm thickness. Next, the UV irradiation was carried out for the coupling treatment layer in the same conditions as in Example 1, except that the UV irradiation time was changed, and the surface composition ratio of each obtained sample was measured. The results are shown in Table 16. The nitrogen surface composition ratio was expressed as atomic percentage (%) of nitrogen after UV irradiation as compared with the atomic percentage 100% of nitrogen before UV irradiation (Measurement Example 1).

TABLE 16

|  | Measurement Examples 1 | Measurement Examples 2 | Measurement Examples 3 | Measurement Examples 4 | Measurement Examples 5 |
|---|---|---|---|---|---|
| Inorganic substrate material | Si wafer | Si wafer | Si wafer | Si wafer | Si wafer |

TABLE 16-continued

| | Measurement Examples 1 | Measurement Examples 2 | Measurement Examples 3 | Measurement Examples 4 | Measurement Examples 5 |
|---|---|---|---|---|---|
| SC layer thickness (nm) | 11 | 11 | 11 | 11 | 11 |
| UV irradiation time (sec) | 0 | 10 | 30 | 120 | 1800 |
| Atomic Percentage C (%) | 47 | 44 | 38 | 17 | 4 |
| Atomic Percentage N (%) | 10 | 7 | 6 | 2 | 0.1 |
| Atomic Percentage O (%) | 24 | 32 | 37 | 53 | 59 |
| Atomic Percentage Si (%) | 19 | 18 | 19 | 28 | 37 |
| Nitrogen surface composition ratio (%) | 100 | 67 | 58 | 22 | 0.1 |

(Application Example)

Each laminate obtained in Examples 1 to 15 and respective Comparative Examples was fixed on a basal plate holder in a sputtering apparatus while a stainless frame having an aperture part was set thereon. The basal plate holder and the substrate of each laminate was fixed so as to be stuck with each other, and a cooling medium was led to the basal plate holder to make it possible to set the temperature of the film of the laminate, and the temperature of the film of the laminate was set to 2° C. First, plasma treatment was carried out for the film surface. The plasma treatment conditions were set to, in argon gas, a frequency of 13.56 MHz, an output of 200 W, and a gas pressure of $1\times10^{-3}$ Torr; the temperature at the time of treatment was 2° C., and the treatment time was 2 minutes. Next, using a nickel-chromium (chromium 10 mass %) alloy as a target, a 11 nm thick nickel-chromium alloy coating (underlayer) was formed by a DC magnetron sputtering method at 1 nm/second rate in an argon atmosphere under the conditions of a frequency of 13.56 MHz, an output of 450 W, and a gas pressure of $3\times10^{-3}$ Torr. Further, the temperature of the film of the laminate was set to 2° C. by bringing the back surface of the basal plate to the sputtered surface into contact with the SUS plate of the basal plate holder to which the cooling medium controlled at a temperature of 3° C. was led, and the sputtering was carried out. Thereafter, copper was vapor deposited at 10 nm/second rate to form a 0.22 μm-thick thin copper film. As described above, a laminate plate bearing a metal thin film-formed film as an underlayer was obtained from each film. The thickness of the copper film and that of the NiCr layer were confirmed by a fluorescent x-ray analysis.

Next, each laminate bearing a metal thin film-formed film as an underlayer produced from each film was fixed in a frame made of Cu, and plated by immersing in an electroplating solution (80 g/L copper sulfate, 210 g/L sulfuric acid, HCl, and a small amount of a brightening agent) using a copper sulfate plating bath, and a thick copper plating layer (thick layer) with 4 μm thickness was formed by applying electric power at 1.5 Adm². Successively, the laminate was heated at 120° C. for 10 minutes, followed by drying, to obtain a metalized polyimide film/substrate laminate.

After applying a photoresist ("FR-200", manufactured by Shipley) to each obtained metalized polyimide film/substrate laminate, followed by drying, the photoresist was exposed through a closely set glass photomask and developed with an aqueous 1.2 mass % KOH solution. Next, etching was carried out at 40° C. and 2 kgf/cm² spray pressure along an etching line of a cupric chloride containing HCl and hydrogen peroxide to form lines of line/space=20 μm/20 μm as a test pattern. Next, after electroless tin plating with 0.5 μm thickness was performed, annealing treatment was carried out at 125° C. for 1 hour. The formed pattern was observed with an optical microscope to evaluate the presence or absence of dripping, pattern residues, and pattern peeling.

In the case of using the polyimide film laminates of Examples 1 to 15, good patterns without occurrence of dripping, pattern residues, and pattern peeling were obtained. Thereafter, no blistering or peeling was caused even after heating to 400° C. at a temperature rising speed of 10° C./minute in a muffle furnace replaced with nitrogen, keeping at 400° C. for 1 hour, and spontaneously cooling.

On the other hand, in the case of using the polyimide film laminates of respective Comparative Examples, film peeling was caused and no good pattern was obtained.

According to the results of Application Examples above, it was confirmed that a laminate with properly adjusted delamination strength of a substrate and a polyimide film, which was produced by the production method of the present invention, could endure the respective steps such as metallization and that a good pattern could be formed in the pattern fabrication carried out thereafter.

INDUSTRIAL APPLICABILITY

It is made easy for a laminate obtained by the production method of the present invention to peel a polyimide film from a substrate by cutting the polyimide film in easily peeling parts at the time of laminating a device. The laminate can endure the steps such as metallization and gives a good pattern in pattern fabrication carried out thereafter. Accordingly, the laminate of the present invention can be effectively used in the process for producing a device structure on an extremely thin polyimide film, and a circuit or device can be formed precisely on a polymer film extremely thin and excellent in insulation properties, heat resistance, and dimensional stability. Consequently, the laminate is useful for production of device structures such as sensors, display devices, probes, integrated circuits, their composite devices, amorphous Si thin film solar cells, Se and CIGS-based compound semiconductor thin film solar cell basal plates, and solar cells using them, and thus significantly contributes in industrial fields.

DESCRIPTION OF REFERENCE SIGNS

1: Glass basal plate
2: Coupling treatment layer
3: UV light-shielding mask
4: UV non-irradiated parts in coupling treatment layer
5: UV irradiation parts in coupling treatment layer
6: Polyimide film 7: Polyimide film on UV irradiation parts in coupling treatment layer
8: Device
10: Good adhesion part
20: Easily peeling part

The invention claimed is:

1. A laminate comprising a substrate, a polyimide film, and a coupling treatment layer interposed therebetween, wherein delamination strength between the substrate and the polyimide film is different between good adhesion parts and easily peeling parts, forming a prescribed pattern.

2. The laminate according to claim 1, wherein 180-degree peel strength between the substrate and the polyimide film in the easily peeling part is ½ or lower of 180-degree peel strength between the substrate and the polyimide film in the good adhesion part.

3. The laminate according to claim 1, wherein the polyimide film is a film obtained by reaction of diamines containing an aromatic diamine having a benzoxazole structure and tetracarboxylic acids.

4. A method of producing the laminate of claim 1, the method comprising:
providing a substrate having at least a first surface;
providing a polyimide film having at least a second surface subjected to plasma treatment;
performing a coupling agent treatment on at least one of the first and second surfaces to form a coupling treatment layer;
carrying out an inactivation treatment of a portion of the coupling treatment layer to form a prescribed pattern; and
laying the polyimide film on the substrate so that the first surface faces the second surface, followed by pressurizing and heating the polyimide film on the substrate to form the laminate comprising the substrate, the polyimide film, and the coupling treatment layer interposed therebetween.

5. The method for producing a laminate according to claim 4, wherein at least one kind treatment selected from the group consisting of blast treatment, vacuum plasma treatment, atmospheric pressure plasma treatment, corona treatment, active radiation irradiation treatment, active gas treatment, and chemical liquid treatment is carried out as the inactivation treatment.

6. The method for producing a laminate according to claim 5, wherein at least UV irradiation treatment is carried out as the inactivation treatment.

7. The method for producing a laminate according to claim 4, wherein the pressurizing and heating treatment is carried out using a roll.

8. The method for producing a laminate according to claim 4, wherein the pressurizing and heating treatment is carried out in vacuum.

9. The method for producing a laminate according to claim 4, wherein the pressurizing and heating treatment is carried out separately in pressurizing process and heating process by pressurizing at a temperature lower than 120° C. and then heating at a temperature of 120° C. or higher under low pressure or normal pressure.

10. The method for producing a laminate according to claim 4, wherein a film treated with acid treatment after the plasma treatment is used as the polyimide film.

11. The method for producing a laminate according to claim 4, wherein a film obtained by reaction of diamines containing an aromatic diamine having a benzoxazole structure and tetracarboxylic acids is used as the polyimide film.

12. A method for producing a structure having a device formed on a polyimide film, the method comprising:
providing the laminate of claim 1;
forming a device on the polyimide film of the laminate;
making a cut in the polyimide film at an easily peeling part of the laminate; and
peeling the polyimide film from the substrate.

13. The laminate according to claim 2, wherein the polyimide film is a film obtained by reaction of diamines containing an aromatic diamine having a benzoxazole structure and tetracarboxylic acids.

14. A method for producing a structure having a device formed on a polyimide film, the method comprising:
providing the laminate of claim 2;
forming a device on the polyimide film of the laminate;
making a cut in the polyimide film at an easily peeling part of the laminate; and
peeling the polyimide film from the substrate.

15. A method for producing a structure having a device formed on a polyimide film, the method comprising:
providing the laminate of claim 2;
forming a device on the polyimide film of the laminate;
making a cut in the polyimide film at an easily peeling part of the laminate; and
peeling the polyimide film from the substrate.

16. A method for producing a structure having a device formed on a polyimide film, the method comprising:
providing the laminate of claim 13;
forming a device on the polyimide film of the laminate;
making a cut in the polyimide film at an easily peeling part of the laminate; and
peeling the polyimide film from the substrate.

* * * * *